US011951375B2

(12) United States Patent
Felker

(10) Patent No.: US 11,951,375 B2
(45) Date of Patent: *Apr. 9, 2024

(54) APPARATUS AND METHOD FOR OPTIMIZING A PERSON'S MUSCLE GROUP PERFORMANCE THRU MODULATING ACTIVE MUSCLE GROUPS EXERTION RATE AND OXYGEN QUANTUM

(71) Applicant: Thomas S. Felker, Manson, WA (US)

(72) Inventor: Thomas S. Felker, Manson, WA (US)

( * ) Notice: Subject to any disclaimer, the term of this patent is extended or adjusted under 35 U.S.C. 154(b) by 580 days.

This patent is subject to a terminal disclaimer.

(21) Appl. No.: 17/195,034

(22) Filed: Mar. 8, 2021

(65) Prior Publication Data

US 2021/0268360 A1 Sep. 2, 2021

Related U.S. Application Data

(63) Continuation of application No. 15/683,509, filed on Aug. 22, 2017, now Pat. No. 10,946,263.
(Continued)

(51) Int. Cl.
A63B 71/06 (2006.01)
A63B 24/00 (2006.01)
(Continued)

(52) U.S. Cl.
CPC .......... *A63B 71/0622* (2013.01); *A63B 24/00* (2013.01); *A63B 24/0062* (2013.01); *A63B 71/06* (2013.01); *A63B 21/4041* (2015.10); *A63B 22/0002* (2013.01); *A63B 24/0087* (2013.01); *G09B 19/00* (2013.01)

(58) Field of Classification Search
None
See application file for complete search history.

(56) References Cited

U.S. PATENT DOCUMENTS 4,923,193 A 5/1990 Pitzen et al.
9,135,347 B2 9/2015 Damman
(Continued)

OTHER PUBLICATIONS

Exercise Training Increases Size of Hippocampus and Improves Memory; Erickson, et al. www.pnas.org/cgi/coi/10.1073/pnas. 1015950108; Dec. 30, 2010.
(Continued)

*Primary Examiner* — James B Hull
(74) *Attorney, Agent, or Firm* — Schmeiser, Olsen & Watts LLP

(57) ABSTRACT

A system and method for optimizing a person's muscle group performance thru modulating the arm, leg, and core muscle exertion rate based upon the exerciser's metabolic and geographic data. The system uses real-time measurement gathering and storing of physiologic parameters from humans during physical exercise activity and the geographic data of the exercise activity to determine information for optimizing the exerciser's physical exercise performance of the basic working muscle groups in the rider's arms, legs, and core. The system broadcasts to exercisers information including, but are not limited to: a) the current condition of their monitored muscle tissue, b) which muscle groups the riders should modulate and change their level of energy output during the exercise activity, and c) level of energy exertion at which riders should be employing at that moment in the relevant working muscle groups to optimize their physical exercise performance.

4 Claims, 13 Drawing Sheets

Related U.S. Application Data

(60) Provisional application No. 62/377,837, filed on Aug. 22, 2016.

(51) Int. Cl.
    *A63B 21/00*     (2006.01)
    *A63B 22/00*     (2006.01)
    *G09B 19/00*     (2006.01)

(56) References Cited

U.S. PATENT DOCUMENTS

| | | |
|---|---|---|
| 2003/0125167 A1 | 7/2003 | Copeland |
| 2013/0096403 A1 | 4/2013 | Dacso et al. |
| 2018/0161658 A1 | 6/2018 | Felker |

OTHER PUBLICATIONS

Cardiorespiratory Fitness and Accelerated Cognitive Decline With Aging; Wendell, et al. J Gerentol A Biol Sci Med Sci Apr. 2014; 69(4); 455-462.

Physical activity and telomere length in U.S. men and women: An Nhanes investigation; Prev Med. Jul. 2017;100;145-15. Apr. 24, 2017.

Felker, Thomas S., Exercise System, Patent Cooperation Treaty Application Serial No. PCT/US22/14770, International Filing Date Feb. 1, 2022, International Search Report and Written Opinion dated Jun. 6, 2022.

APPARATUS AND METHOD FOR OPTIMIZING A PERSON'S MUSCLE GROUP PERFORMANCE THRU MODULATING ACTIVE MUSCLE GROUPS EXERTION RATE AND OXYGEN QUANTUM

CROSS REFERENCE TO RELATED APPLICATION[S]

This application is a continuation of U.S. patent application Ser. No. 15/683,509, filed Aug. 22, 2017, which claims priority to U.S. Provisional Patent Application Ser. No. 62/377,837, filed Aug. 22, 2016, the disclosure of which is hereby incorporated entirely herein by reference.

BACKGROUND OF THE INVENTION

Technical Field

This invention relates generally to an exercise system and more particularly to a system and method for optimizing a person's muscle group performance thru modulating the arm, leg, and core muscle exertion rate based upon the exerciser's metabolic and geographic data of the exercise activity.

State of the Art

During exercise, a person reaches their "lactate threshold" when insufficient oxygen is available for the body to meet its energy demands solely by aerobic metabolism of sugars. At the lactate threshold, muscles begin to metabolize sugars anaerobically—independent of oxygen—to make up the difference. Lactate is created at the cellular level during anaerobic metabolism, and results from the incomplete oxidation of sugars. A continued high energy demand of working muscle groups soon causes the local formation of lactate to exceed the rate of lactate clearance, wherein lactate accumulates within the muscles. An exerciser's maximum steady state lactate clearance level can be defined as the maximum amount of muscle energy exertion that can occur, while at the same time, the lactate being secreted from this working muscle is cleared by metabolic activity of the exerciser. For decades, physical fitness, rowing, running, and competitive bicycling trainers have been developing different mechanisms to: a) measure the secretion rate of lactate from muscle tissue at various levels of energy output from relevant muscle groups, b) improve an exerciser's physical fitness as measured by increasing the level of his maximum lactate steady state clearance rate, c) employ more muscle groups by a cyclist while exercising in order to in-put additional power into rotating the driving wheel—for example adding arm power to the rider's leg power, and d) inputting more power into the rotation of the driving wheel, or with each oar stroking through the water in the case of an oarsman.

In addition to improving athletic performance, regular exercise has many collateral benefits, some of which have been known for decades and others that have been discovered more recently. Some examples of these collateral benefits include increased cardiovascular health and lower blood pressure; improved immune function, improved metabolic state with weight loss and favorable muscle-to-fat compositional changes, lower blood glucose, decreased insulin resistance, and increased HDL cholesterol. Improved cerebrovascular health has also been observed, such as possible decreased risks for stroke, age-related cognitive decline, and multiple degenerative diseases of the brain and central nervous system, including, but not limited to, Parkinsonism, dementia, and Alzheimer's Disease.

These and other beneficial effects to the brain are likely the result of increased cellular oxygen delivery resulting from improvements in microvascular circulation and oxygen ($O_2$) carrying capacity. Increased oxygen delivery is a known result of exercise, particularly, vigorous exercise. The maximum amount of $O_2$ a person's body is capable of metabolizing aerobically, under optimal conditions, is the $VO_2$ max.

Apparatus and Method for Improving Training Threshold, under USPTO Application No. 2013/0096403 A1, dated Apr. 18, 2013, illustrates a non-invasive device that will measure various physiological parameters of cyclists and runners in real-time. Using Near Infrared Spectroscopy (NIRS) the device can, in real-time, determine the oxygenation parameter of various metabolic markers from the rider. Sequential readings by the device of one or more of these metabolic markers can be processed into recommendations to riders, in real-time, as to what their lactate secretion level is relative to their maximum lactate steady state and lactate threshold of the specific muscle groups being monitored, such arms, legs, and core muscles. With regard to the real-time and actually collected biomarker data, the '403 application does not describe any means for using this data to calculate and recommend to cyclists from which source, and amount of their energy output, arms or legs, or core with which they should modulate their level of energy exertion in order to optimize the body's physical performance, optimize cardiovascular and brain health, and improve overall health.

Several manufacturers of pedal/crank watt meter devices measure the amount of energy (watts) being delivered by riders from the cyclic movement of each leg. The readings are provided to the rider in real-time while pedaling.

Power Tap is a watt meter device, installed in the rear driving axle of a bike. It measures the total amount of watt energy being delivered into the axle from all muscle groups providing power to it. In the past, virtually all of this watt energy was created by riders using only their legs to pedal the crank axle. This crank axle then rotates the chain of the bicycle to power the drive wheel.

The '403 application also does not reference any notion of compiling a biomarker data bank from past exercising activities in order to establish a baseline level of performance for a specific rider at various levels of exercise endurance, and tracking this past data using many different types of biomarker information. Because the Muscle Optimizing Modulator also collects the rider's watt output data from various muscle groups contemporaneously with its collection of his bio marker data, the Muscle Optimizing Modulator is able to recommend specific sources and amounts of energy output that riders should be employing in order to work their various classes of muscle groups. By following these energy output modulation recommendations, riders will deliver their whole body's optimum physical fitness performance for a given physical fitness activity.

There are many sports monitoring devices that have built-in wireless radios to transmit and receive data for processing. They also have onboard processors that can calculate lactate clearance levels for various leg and arm muscle groups in real-time, and express them to the rider.

However, there are currently no sports monitoring devices that will simultaneously accomplish all of the following functions: a) receive a rider's metabolic data from a plurality of muscle groups of the arms, legs, and core used to power the bike, b) compare the measured data to an established metabolic curve to extrapolate proximity to the rider's lactate threshold for such muscle groups; 3) direct modulation of the rider's energy output according to the metabolic condition of each monitored muscle group; and c) collect and process geographic data for the rider's course to prevent the rider from exceeding, but at the same time optimizing the lactate steady state level for each muscle group.

Accordingly, what is needed is a system and device which can recommend various energy modulation rates between muscle groups, such as muscle groups in the arms, legs, and core, allowing the exerciser to achieve maximum benefit from the activity, such as reaching his lactate threshold level as he completes his exercise activity, or tailoring his workouts over time to optimize hemoglobin/hematocrit levels, cerebrovascular health, blood sugar/blood insulin levels, and other clinical or biometric parameters, according to the goals of the exerciser.

SUMMARY OF THE INVENTION

The present invention relates to real-time and contemporaneous measurement gathering and storing of physiologic parameters from humans during physical exercise activity, the geographic data of elevations, grades, and distances of exercise events, and then processing them together into useful information for optimizing the exerciser's physical exercise performance from all or combinations of the basic working muscle groups in the rider's arms, legs, and core. The exerciser's performance optimization occurs as a result of the invention broadcasting to users the recommended modulation and change of energy exertion they should employ between working muscles in their arms, legs, and core. Examples of exercise activities in which the current invention will be useful include, but are not limited to: cycling—both indoor training and outside riding, rowing, cross-country skiing, running, cross-fit, and swimming. The measurement and processing of geographic data points and physiologic bio markers is for the purpose of broadcasting to exercisers several useful categories of information. These include, but are not limited to: a) the current condition of their monitored muscle tissue relative to its maximum steady state lactate clearance level and threshold level, b) which class of muscle groups the riders should modulate and change their level of energy output during the exercise activity, and c) level of energy exertion at which riders should be employing at that moment in each class of relevant working muscle groups in order to optimize their physical exercise performance on a particular trek or for a specific purpose.

The location for placement of metabolic measurement devices depends upon the specific working muscle group or groups and metabolic markers that are being measured. For example, in using the NIRS device, it should be placed upon one or more of the muscle groups which will be used during the exercise activity. Alternatively, an implantable sensor/transducer, such as a Pulsar device, may be inserted proximate to a monitored muscle group is employed to obtain localized measurements in real time.

While riders read or hear their measured bio-marker data, the current invention will also broadcast to them which class of muscle groups to which they should modulate at that moment in order for them to optimize their physical exercise performance throughout the entire exercise activity. Examples of the various classes of muscle groups include those in the: a) arms, b) legs, and c) core muscle classes.

The metabolic marker monitoring devices will monitor the riders' physiologic data invasively or non-invasively. One of the non-invasive methodologies that can be employed to monitor and gather these data, such as oxygenation, is through the use of photo-optics with Near Infrared Spectroscopy (NIRS). Other types of biomarker sensing devices can measure such metabolic data as respiratory rate, heart rate, and tissue oxygen saturation with calculation of oxygen uptake of the exerciser.

A predicate for processing the rider's real-time metabolic data into a useful energy exertion recommendation for multiple muscle groups, such as arm, leg, and core muscle groups, is that riders first establish base line data. This base line data can consist of many categories of metabolic data including, but not be limited to: a) oxygen saturation of hemoglobin; b) hemoglobin concentration; c) steady state lactate acid optimization readings at various levels of physical exertion over time; d) heartrate versus level of lactate secretion over time; e) oxygen uptake at various levels of physical exertion over time; and (f) respiratory rate over time at various levels of physical exertion. These baseline data will also include power output (watts) from each relevant muscle group at the time of the metabolic reading.

Once metabolic curves from these baseline data have been established, the invention will compare concurrent biomarker measurements taken during the exercise activity with the baseline data, review the geographic conditions remaining to be encountered-such as elevations and surface distance of the trek, and then process and recommend to the exerciser specific amounts of power (watts) that the exerciser should be exerting at a given geographic point in the trek from muscle groups in each class of muscle tissue being monitored. With this recommended modulation of power (watts) output information, the rider can optimize his physical exercise performance for a particular training or competitive activity by modulating his energy output from specific monitored muscle groups in his arms, legs, and core, at various points along his exercise path. It is also important for the storage data bank to have stored in it various geographic characteristics of current and past riding surfaces, distances of prior exercise events, as well as such factors including but not limited to the total elevation, number of elevation areas, grades of each elevation, and surface distance of the total exercise trail. This will assist the processor in accurately calculating the change of energy output that riders should modulate in various working muscle groups in their arms, legs, and core muscle groups as the riders progress along their exercise activity.

Coupled with use of a Dual Power Drive Train, the Power Tap rear axle watt meter mentioned herein above can measure not only the leg generated energy, but also energy delivered from the riders' arms, the riders' core, or both the arms and core. This function occurs by the on board processor subtracting from the total Power Tap watt reading the crank watt readings. The difference between the rear axle and crank readings is the power (watts) generated from the arms or arms and core.

Disclosed is a system for optimizing an exerciser's muscle group performance comprising an exercise apparatus; watt meters that measure a number of watts being delivered by arms, legs, or core muscle groups of the exerciser; a computing device, wherein the computing device includes a database that contains baseline bio marker data of an exerciser; and bio sensors operatively coupled with the computing device, wherein the bio sensors monitor muscle groups of the exerciser and measure bio marker information of the exerciser, and wherein the computing device is programmed to: concurrently receive immediate bio marker information from the riders' bio sensors and store the relevant bio marker information in the database; receive an input of an exercise activity and store the exercise activity input in the database; automatically calculate modulation recommendations for energy output of the exerciser's bio monitored muscle groups operating the exercise apparatus in response to processing the concurrently taken bio marker information, the baseline bio marker data of the exerciser and the exercise activity input; and broadcast an energy modulation recommendation to the exerciser.

In some embodiments, the baseline bio marker data includes but is not limited to any one or more of the bio markers consisting of heartrate, blood pressure, temperature, hemoglobin level, hematocrit level, oxygen saturation of hemoglobin, and intracerebral blood flow. In some embodiments, the baseline biomarker data includes, but is not limited to any one or more of the serum biomarkers consisting of serum iron, serum ferritin, serum vitamin $B_{12}$, serum folate, serum glucose, serum insulin, erythropoietin alpha, angiogenin, epidermal growth factor, tumor necrosis factor alpha, insulin-like growth factor binding protein-1, insulin-like growth factor binding protein-2, and transforming growth factors alpha and beta.

Disclosed is a system for optimizing an exerciser's muscle group performance comprising an exercise apparatus; a watt meter that measures watts, either separately or in total, generated by an arm muscle group, a leg muscle group, or a core muscle group of the exerciser; a computing device, wherein the computing device includes a database that contains baseline bio marker data of the exerciser; and bio sensors operatively coupled to the computing device, wherein the bio sensors monitor the muscle groups of the exerciser and measure bio marker information of the exerciser, and wherein the computing device is programmed to: receive real-time bio marker information from the bio sensors and store the real-time bio marker information in the database; receive an input of a fitness goal and store the fitness goal input in the database; receive and store the geographic attributes of the trek; automatically calculate modulation recommendations for energy output of the exerciser's monitored muscle groups, operating the exercise apparatus in response to processing the real-time bio marker information, the baseline bio marker data of the exerciser, and the fitness goal input; and broadcast modulation recommendations to the exerciser.

An operational example of the technology of this invention in practice can be gleaned from the following assumed conditions:

1. A rider is riding a trek of 50 miles;
2. His maximum steady state lactate clearance level is achieved when the rider's leg muscles are delivering 200 watts into the drive wheel;
3. However, the rider's maximum steady state lactate clearance level is achieved in the rider's arms when they are delivering 32 watts of power level;
4. Thus the rider's total energy (watts) that he can deliver into the driving wheel, while riding at his overall arm and leg maximum steady state lactate clearance level, can be calculated as follows: 1) 200 power levels from legs input, plus 2) 32 power levels from arm input, equals 3) 232 watts of total energy delivered into the drive wheel by simultaneously inputting energy from both his arms and legs.

In this example, the rider will deliver greater total power (watts) to the drive wheel by using both his arm and leg muscles and modulating between them to maintain a steady-state lactate level.

The foregoing and other features and advantages of the present invention will be apparent from the following more detailed description of the particular embodiments of the invention, as illustrated in the accompanying drawings.

BRIEF DESCRIPTION OF THE DRAWINGS

FIG. 3 shows a watt meter attached to each side of a crank 1b of the user' bicycle. These crank watt meters measure the number of watts being inputted into a particular crank 1b by the rider's leg turning this specific crank.

FIG. 6a is an illustration of the size of the Body Tissue Integrated Biosensor 113 as well as an example of where it could be subcutaneously placed under the skin of a finger of an exerciser. FIG. 6b is a micro size viewing of the bio sensor's scaffolding configuration, which is made of a porous "smart gel" that mimics the 3D microenvironment of cells. The smart gel is linked to a light-emitting molecule that emits a fluorescent signal in the presence of one or more body chemicals such as oxygen, lactate, or other biomarker.

Antennae 7b represents an antennae that broadcasts to the rider the modulation recommendation from the processor. It may also be broadcast to their smart watch, smart phone, display unit positioned on goggles or glasses worn by exercisers, display units attached to helmets, or into ear phones worn by the exerciser. The housing of the computing device is also equipped with a radio and antennae, which operates at appropriate wave lengths, and that broadcasts to the exerciser where his specific geographic position is on the trek;

Antennae 7c represents the antennae and data being transmitted into the computing device from the biomarker monitor, or biosensor.

Antennae 7d represents the antennae that receives data from satellites or cell towers relative to the geographic and position information of a rider on a specific trek.

Port 7e is a USB port into which the rider can plug the computing device (computing device) into the rider's separate computer. The biomarker and geographic data can then be transmitted from the onboard computing device into the computer and vice versa.

Figure 8A:
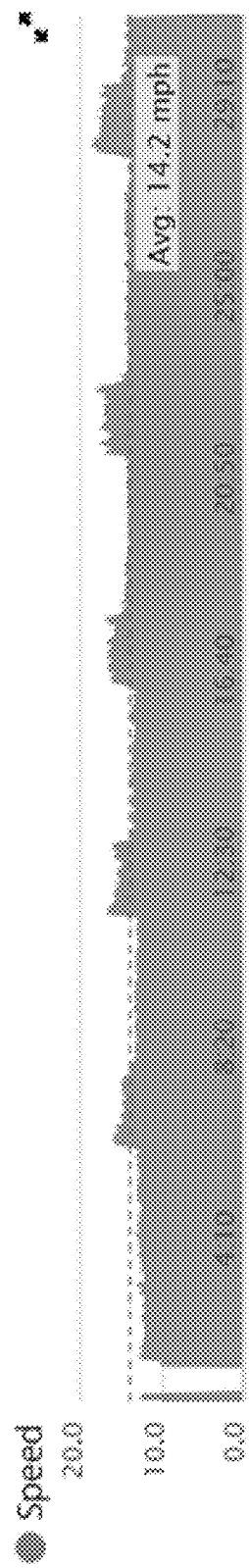
Figure 8B:
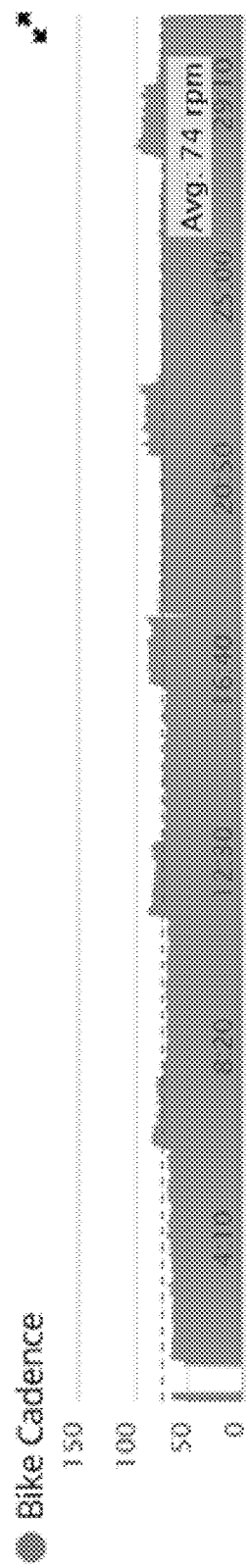
Figure 8C:
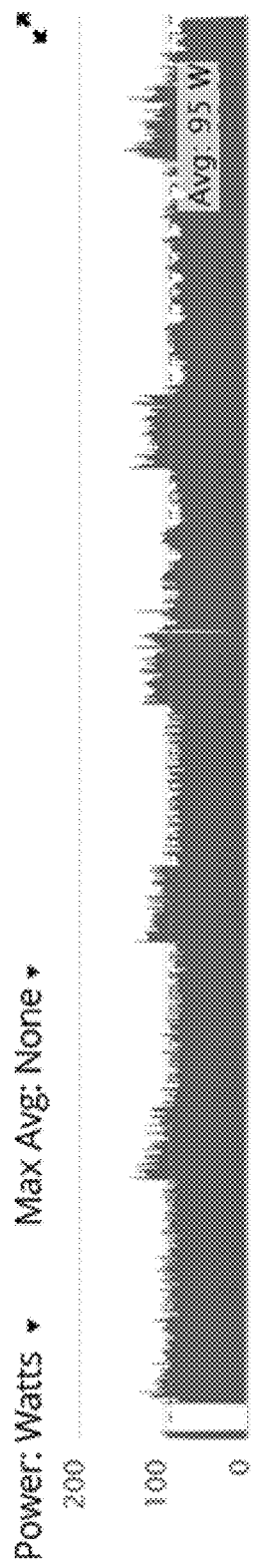

FIGS. 8a-8c are examples of Garmin Edge 520 charts showing the total number of watts being delivered into the driving wheel of a bicycle by a rider when the exerciser is powering the bike with muscles from the following classes of muscle groups: a) only his legs, and b) simultaneously using both his legs and arms. The data and charts illustrate a positive incremental differential between the total number of watts created when the rider uses both his arms and legs to power the bike as opposed to just his legs of just over sixteen percent (16%). This example, from one specific rider, represents one of the classifications of data which the computing device can use in calculating the number of watts the rider should be delivering into the driving wheel from muscle groups in only his legs, or simultaneously in both his arms and legs together to optimize the cyclist's best exercise performance.

Figure 9A:
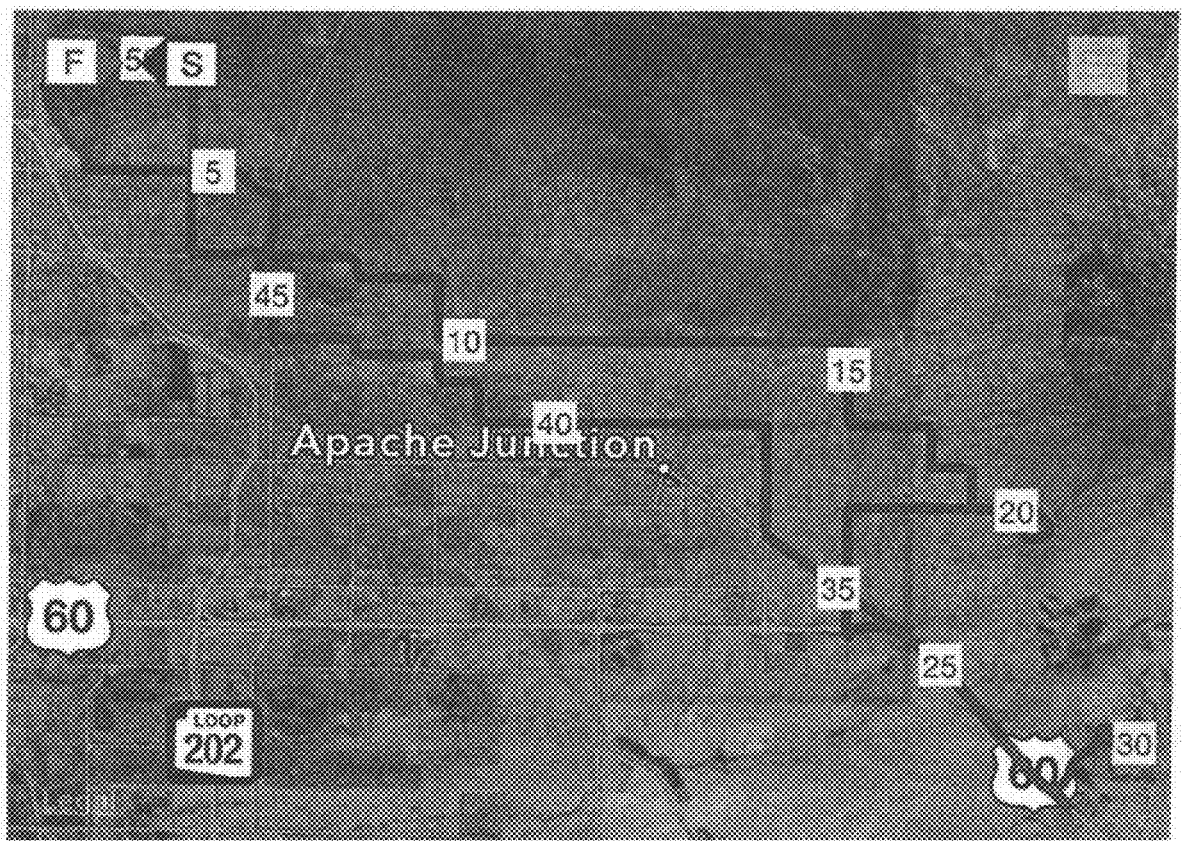
Figure 9B:
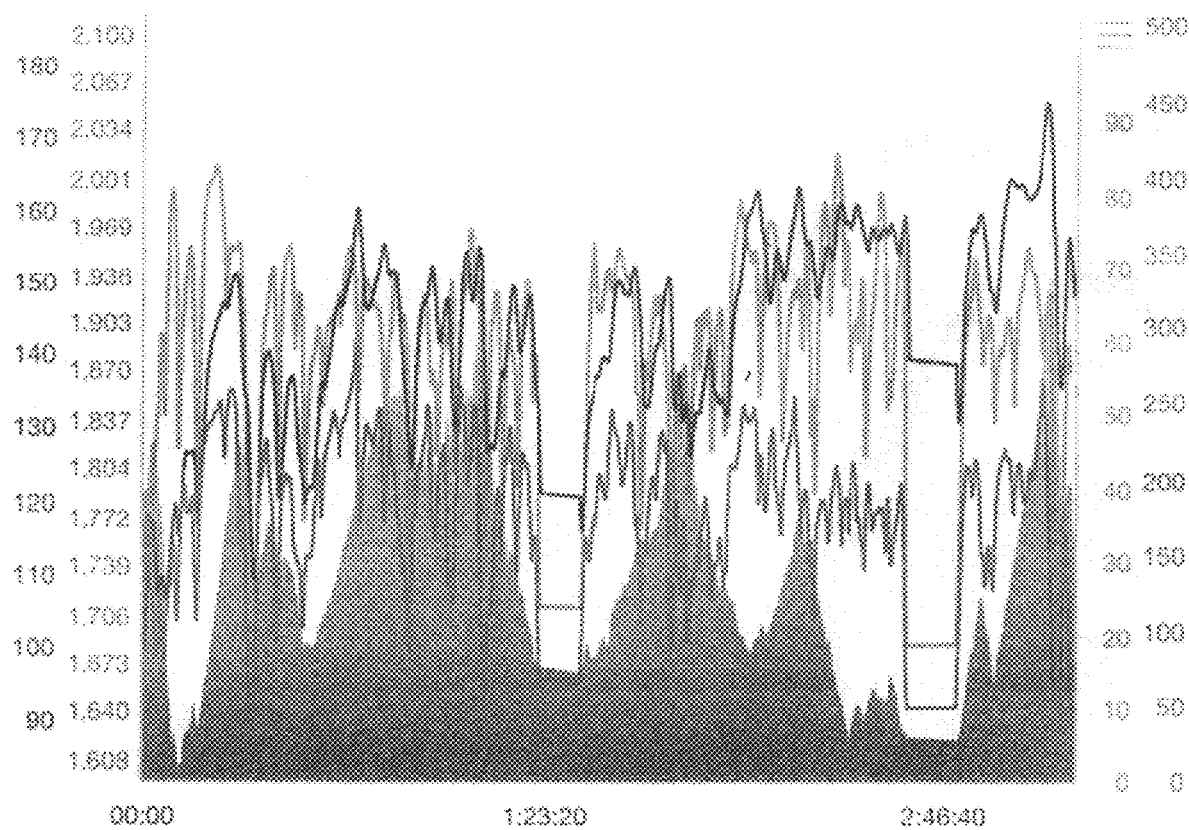

FIG. 9a is an example of a typical dynamic trek map showing: a) the location of a bicycle rider on a defined trek at a given moment in time, b) the elevation of various peaks on the trek, c) the distance that the rider has ridden, d) the amount of distance left to ride in order to complete the exercise activity; and from which such geographic data, along with other metabolic data in the data bank, the computing device can compute the amount of energy (watts) as displayed in FIG. 9b that the rider should be delivering from using his legs only, or using his arms and legs together, or core and arms, in order to optimize his metabolic performance during this exercise activity.

Figure 10:
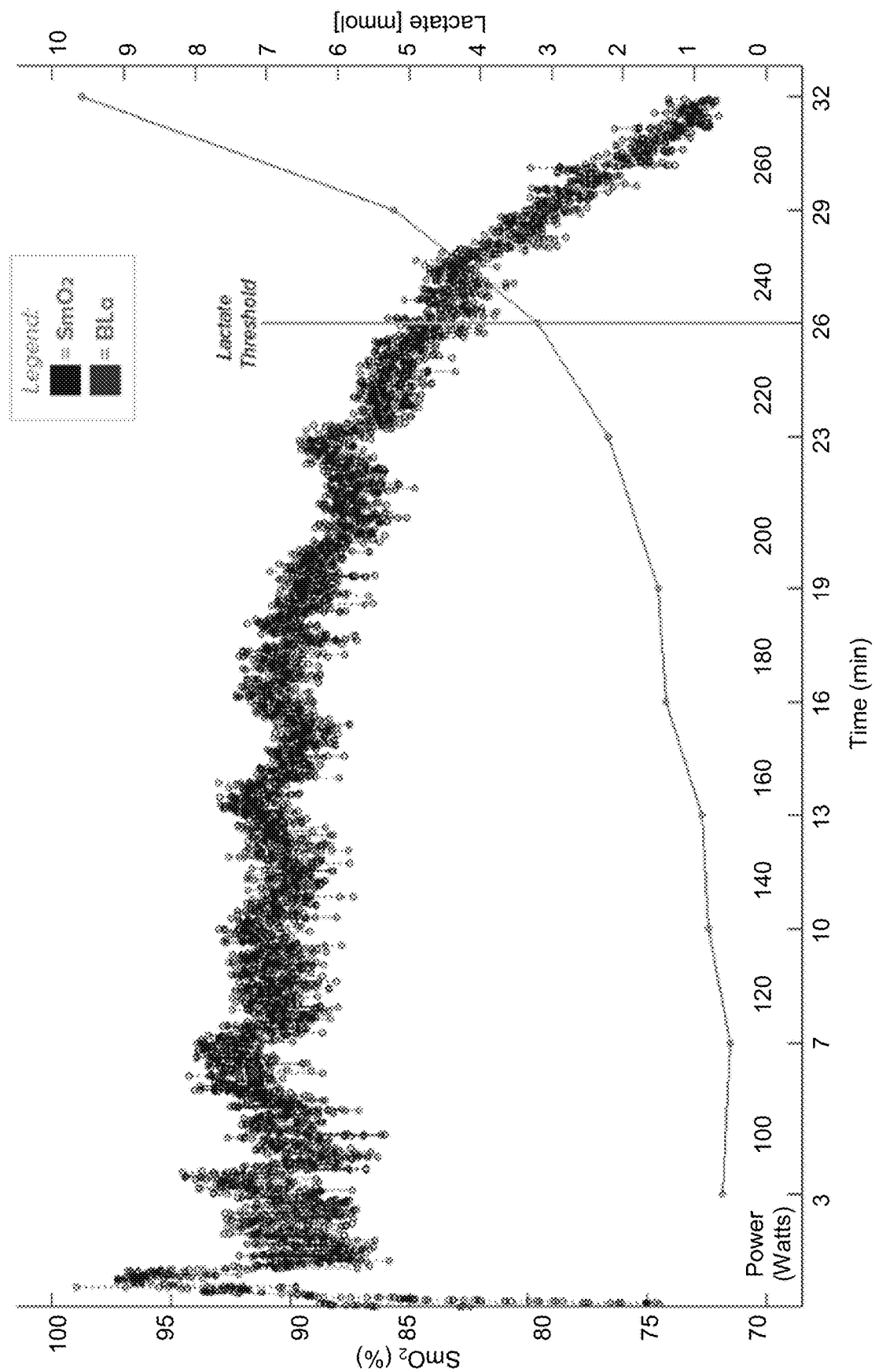

FIG. 10 is the plot of a muscle oxygenation (SmO2) change over time chart overlaid over a blood Lactate (BLa) chart from the same athlete on the same test. The lactate curve references a reading of the amount of energy (watts) being delivered relative to the lactate clearance quantum at a maximum steady state rate and then moving into his lactate threshold.

Figure 11:
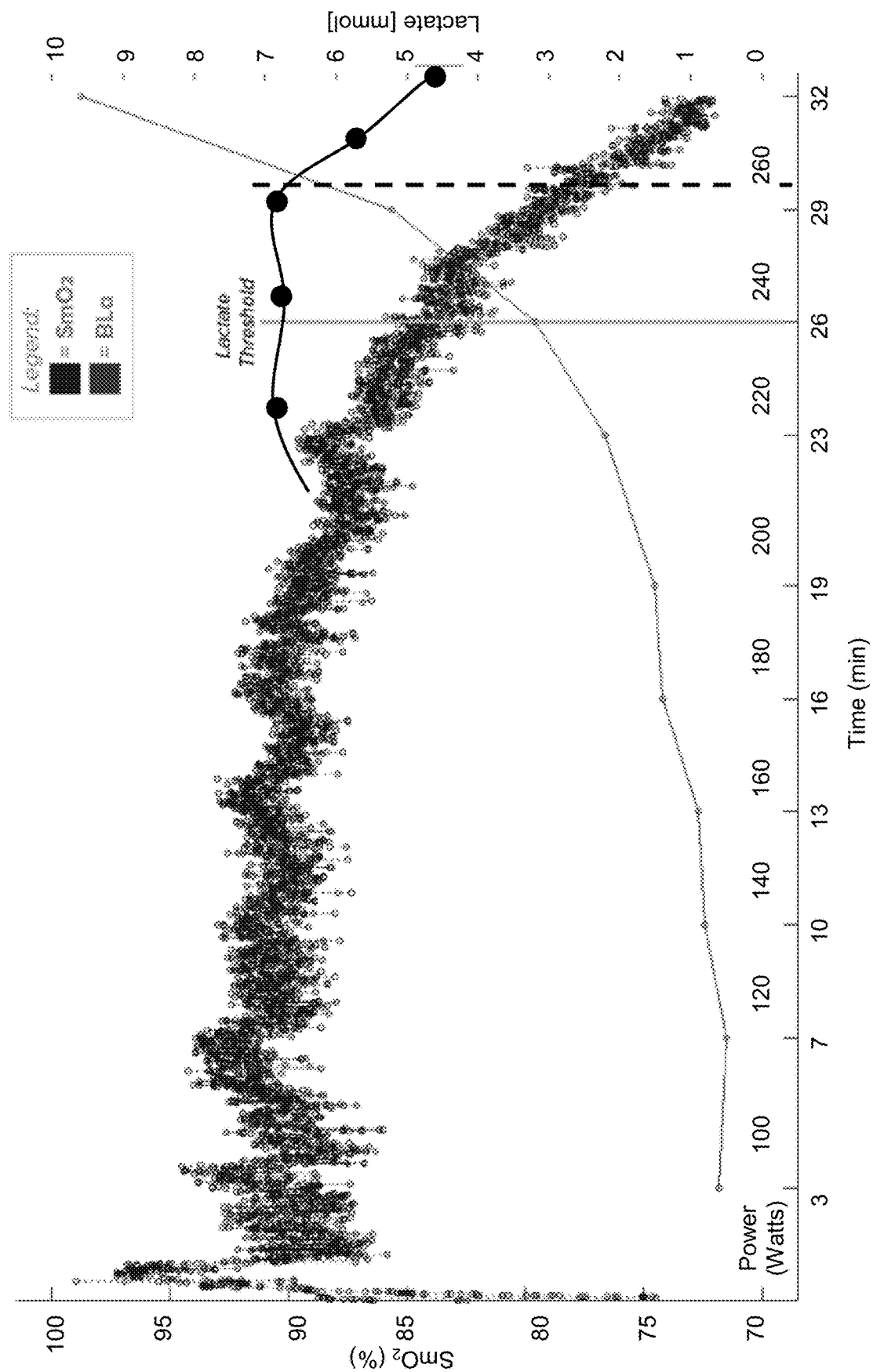

FIG. 11 is a plot that represents combining data from FIGS. 9b and 10. It overlays the input of the incremental watt data from the rider adding the energy from using his arms, as shown in FIG. 9b, with the data from FIG. 10, in which a rider is using just his legs to power the bike. The new graph line, developed from adding the addition of the rider's arm power to that from just his legs, represents the positive results that occur in reducing the lactate secretion rate from the rider's leg muscles as a result of the rider having added additional energy (watts) from oscillating his forearm bars. The substitution of the arm energy (watts) output for the marginal reduction in leg energy output still yields the same number of overall watts being inputted into the drive wheel. However, because the lactate threshold level has been extended over time to the right, due to the reduction in lactate secretion from the rider's legs, the whole lactate threshold curve shifts to the right. This offers a rider the opportunity to further optimize his performance level over time by providing energy from the simultaneous use of both his arms and legs to power the bike.

Figure 12A:
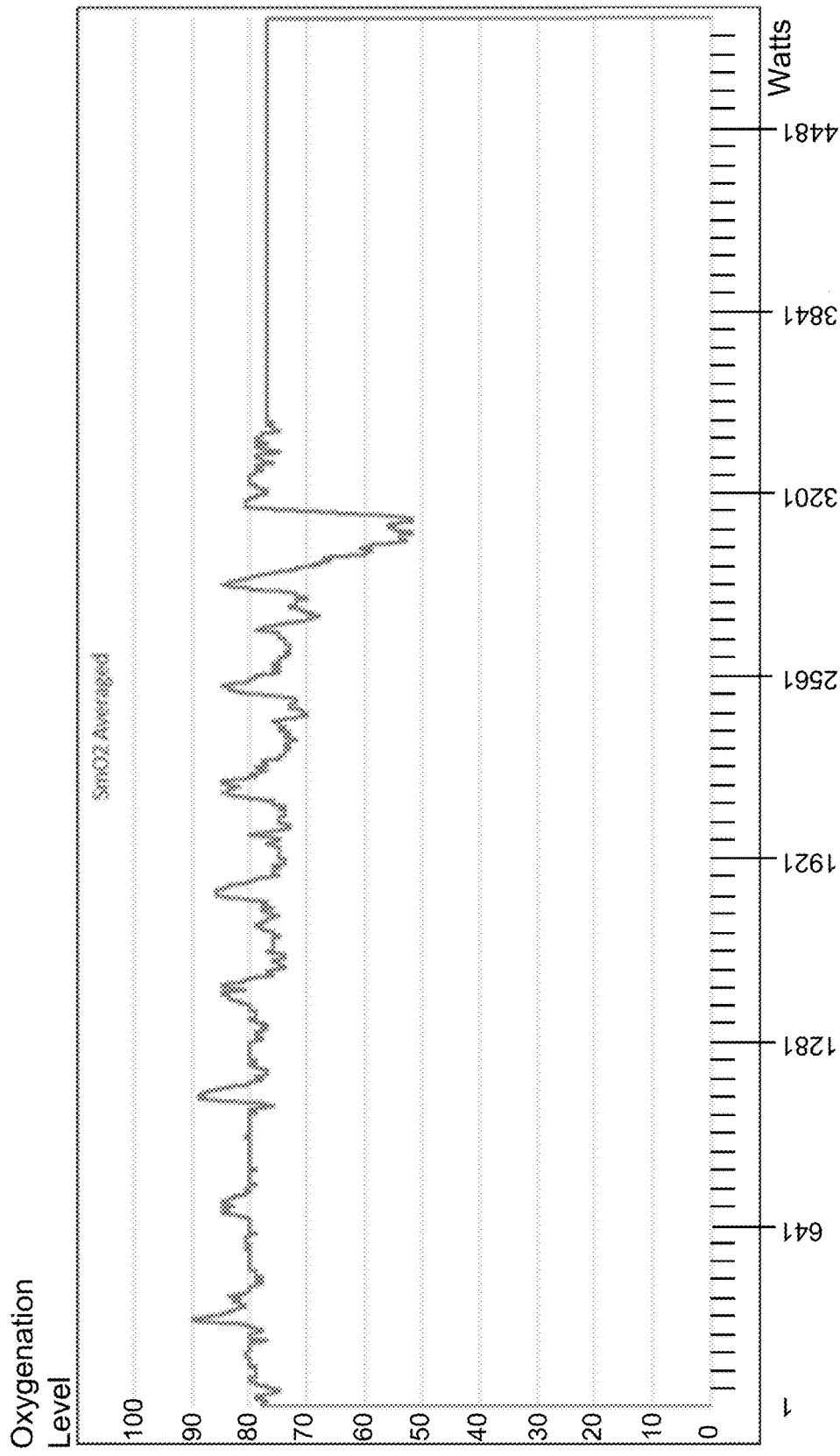
Figure 12B:
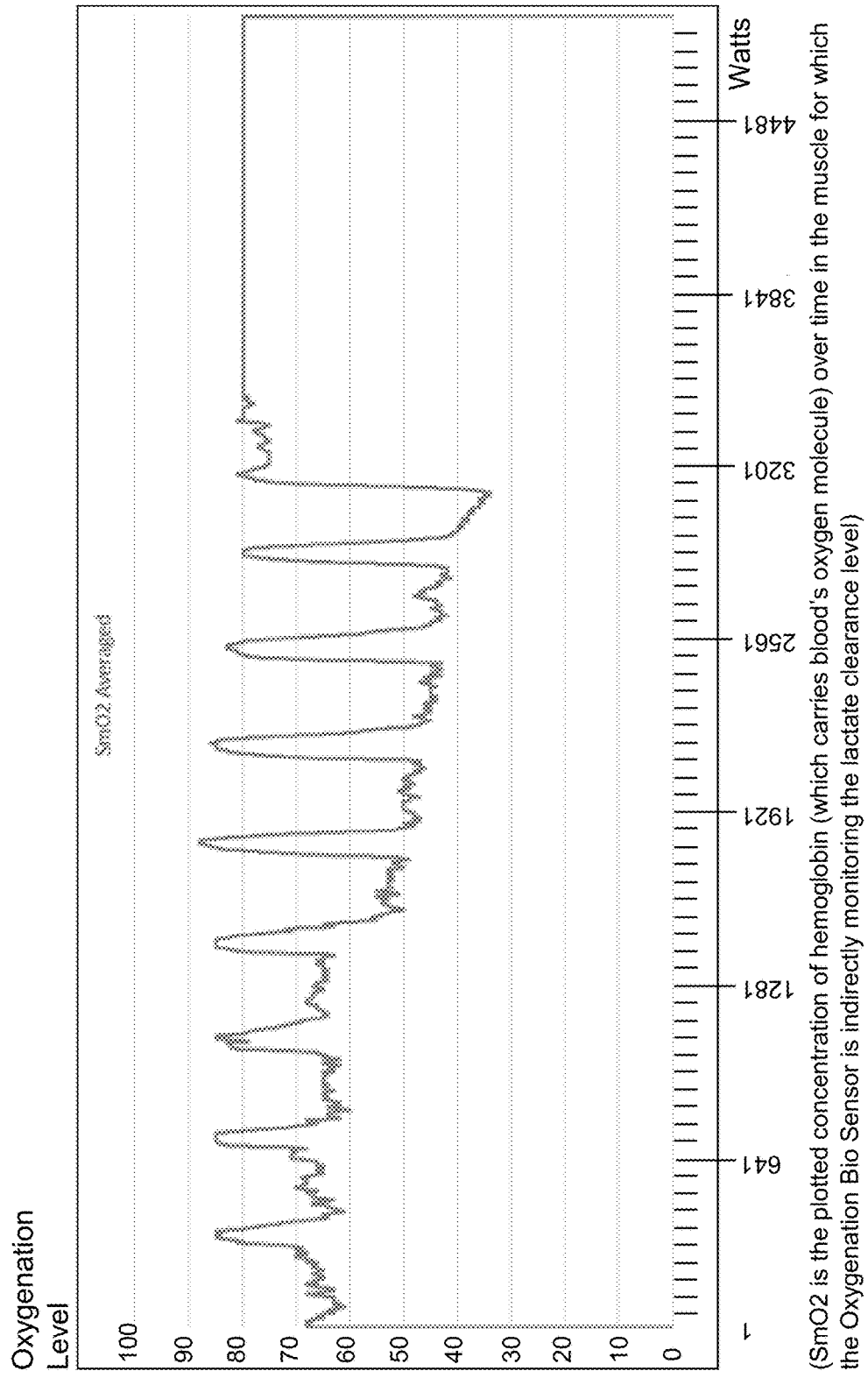

FIGS. 12a and 12b represent graphs showing the results from the same rider on the same exercise routine at the same time. FIGS. 12a and 12b illustrate and compares the oxygenation, and lactate clearance results, observed in the rider's non-working deltoid arm muscle group (FIG. 12a) along with his working leg muscle groups (FIG. 12b).

Figure 13:
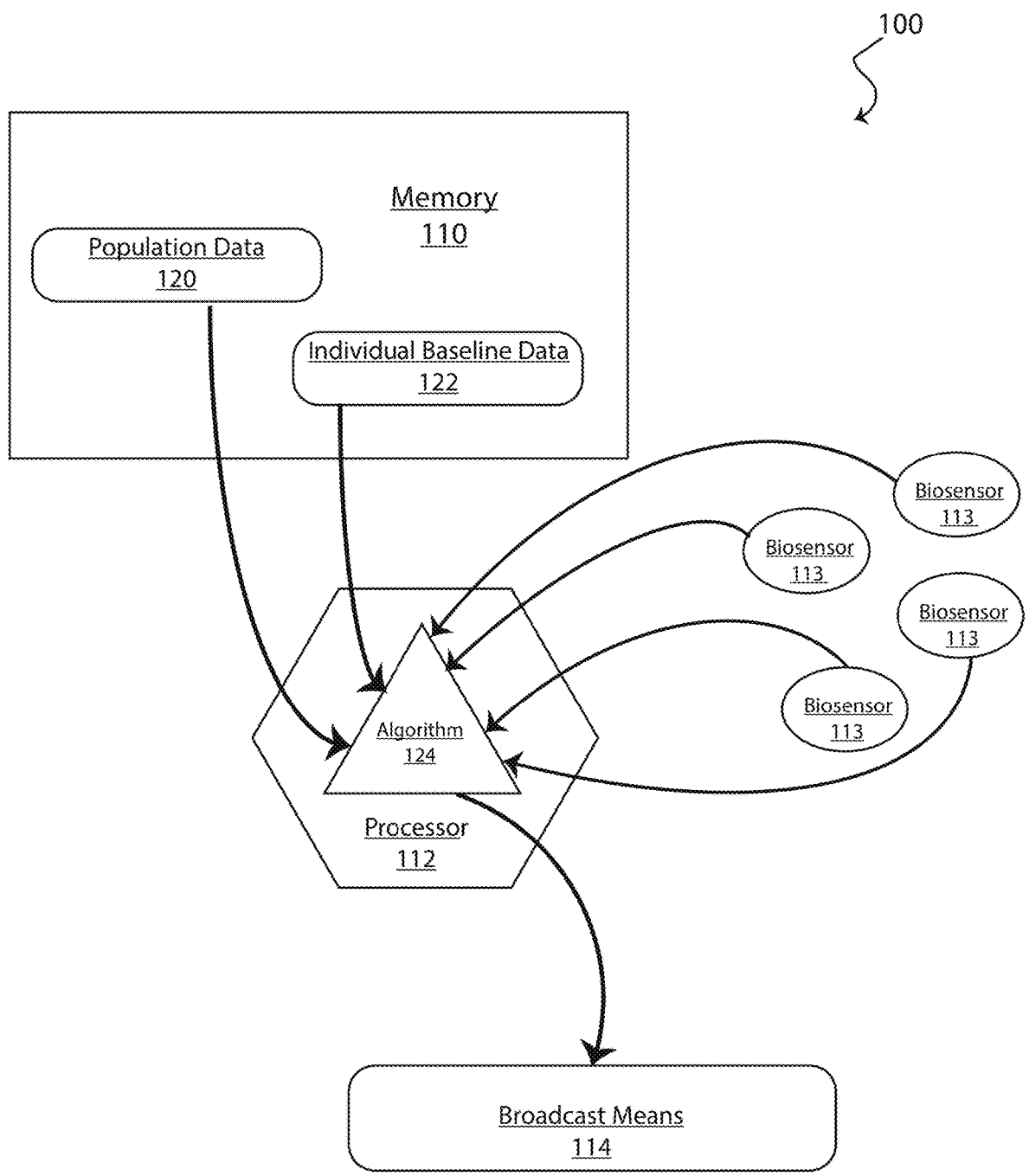

FIG. 13 is a schematic diagram of a computing device of an apparatus for optimizing performance and health.

DETAILED DESCRIPTION OF EMBODIMENTS OF THE INVENTION

With the advent of the Dual Power Bike, and the ability of riders to employ muscle tissue from their arms to power the driving wheel, it is now useful to measure the lactate clearance level of muscle groups in the riders' arms, as well as in their legs and core. A plurality of non-invasive measurements, including but not limited to lactate level, can be taken simultaneously during the rider's exercise activity and immediately communicated to an onboard processor. Additionally, lactate and oxygen saturation measurements can be obtained from non-working muscle groups and compared with values from working muscles. The same is true for participants in other exercising activities—such as oarsmen stroking their oar through the water, runners during their run, cross-country skiers, or swimmers. The rider/exerciser may choose to modulate activity between muscle groups in response to instructions from the processor tailored to a specific goal, such as to increase total power output, or maintain power output within a range predetermined to lead to improvement of a biometric parameter over time. A non-limiting example of such a biometric parameter includes increasing the exerciser's $VO_2$ max and lactate threshold.

The exercisers' measured metabolic marker data, and energy (watts) can then be processed into recommendations to cyclists, or other athletes, informing them of the number of watts that they should be producing in muscle groups located in their legs, as well as those in their arms and core. By exercisers modulating the amount of energy (watts) that they are producing to conform to the processor's recommendation, exercisers will be performing at their optimum level for maintaining their maximum steady state lactate level without exceeding it. This modulation system can also be applicable to athletes that want to reach their lactate threshold just as they finish their exercise activity. This same concept is applicable for oarsmen to optimize their overall rowing performance by modulating their exertion rate of muscle groups in their legs, arms, and core based upon readings of certain metabolic markers, such as where they are on their lactate threshold curve for these various classes of muscle groups. This muscle modulation optimization methodology is applicable to cycling both on an inside stationary trainer as well as outdoor cycling.

The current invention relates to a method, using multiple devices (FIGS. 2,3,4,5,6), to provide an instantaneous metabolic assessment during exercise. This metabolic assessment is generated by measuring biometric parameters, concurrently calculating a real-time lactate clearance level (FIGS. 10,11,12a and 12b) of individual muscle groups located in the arms, legs, and core of cyclists or exercisers while performing an exercise activity; incorporating geographic data encountered on an exercise route; calculating power modulation that riders should distribute between a plurality of muscle groups (FIGS. 1-4) to optimize exercise performance. For example, if riders want to stay at their maximum steady state lactate level (FIGS. 10,11,12a and 12b), it (FIG. 7) will calculate and recommend the power that riders should modulate and exert, for example, between their arms and legs (FIGS. 1-4). Also, if riders wish to reach their lactate threshold (FIGS. 10,11,12a and 12b) at about the time they arrive at the finish line, the Modulating Muscle Optimizer will calculate (FIG. 7) and display (FIG. 1) the requisite power modulation between muscle groups of the riders' arms, legs, and core (FIGS. 1-4) for this goal to be achieved. For the system to perform these calculations, the system needs to receive and store input of an exercise activity in its data base. The exercise activity input may include external data comprising geographic information, weather information, terrain, elevational changes, altitude or combinations thereof.

The method utilized to coordinate the gathering, processing, and broadcasting of the requisite muscle modulation optimization recommendations is, for example, as follows: a) a Biosensor 113 (FIG. 5 or 6) is worn by cyclists, or other exercisers, over the working muscle groups in their legs, arms, or core, b) the Biosensor 113 (FIG. 5 or 6) gathers biomarker data regarding the oxygenation condition of the muscle tissue under it (FIG. 5 or 6), and converts the readings into the current lactate clearance level (FIGS. 10,11,12a and 12b) for the rider at that moment in time and for that group of working muscles, c) this information is then transferred into a separate computing device (FIG. 7) and data bank library (FIG. 7), where it will be compared with the rider's baseline readings for such data under similar exercising conditions (including the geographic information of the exercise path) (FIG. 9a) and relative duration of exercising, d) contemporaneously, this same computing device (or computing devices) (FIG. 7) is receiving geographic data (FIG. 9a) from satellites and cell towers informing it (FIG. 7) of such geographic data as the overall elevations on the trek, surface distance of the ride, grade of each elevation, and location of the exerciser on the trek (FIG. 9a), e) the computing device (FIG. 7) then uses data from all of these different sources to calculate the optimum amount of modulated energy (watts) that should be exerted separately from the riders' arm muscle groups (FIG. 1), as well as their leg muscle groups (FIGS. 1-4), at that location of the rider on this trek (FIG. 9a), and f) this methodology will be continuously repeated during the course of the physical exercise activity, in order for riders to optimize their physical performance by modulating and changing the output level of energy between relevant muscle groups.

Figure 2:
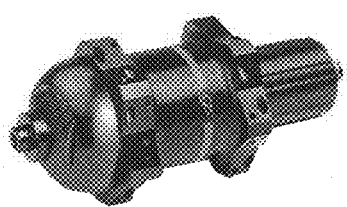
FIG. 2 is a watt meter located inside a rear axle housing of a Dual Power Bike.
Figure 4:
FIG. 4 shows pedal watt meters. Pedal watt meters measure the number of watts being inputted into a particular pedal 1c by the rider's leg attached to this specific pedal.
Figure 3:
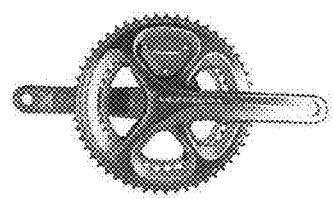
FIG. 3 is a watt meter attached to a crank 1b of an exercise apparatus.
Figure 5A:
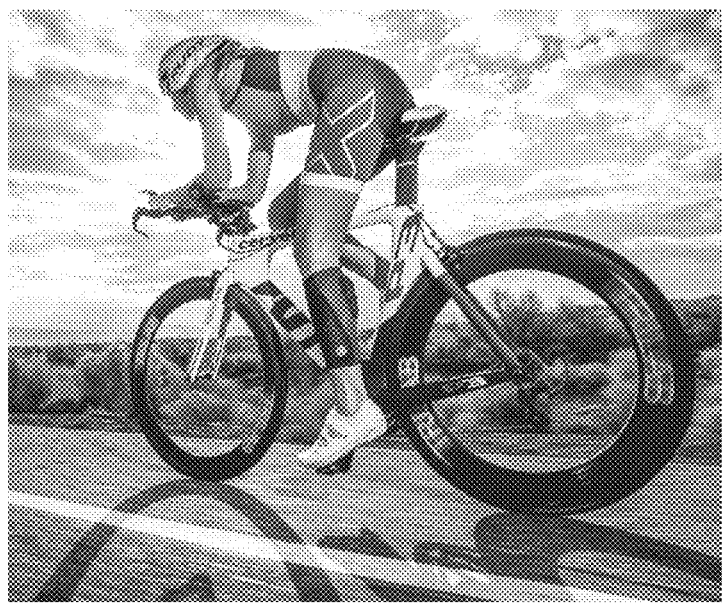
FIG. 5A illustrates a battery powered non-invasive biosensor 113 that is strapped onto a set of muscle groups from which exercisers will be exerting energy during their exercise activity.
Figure 5B:
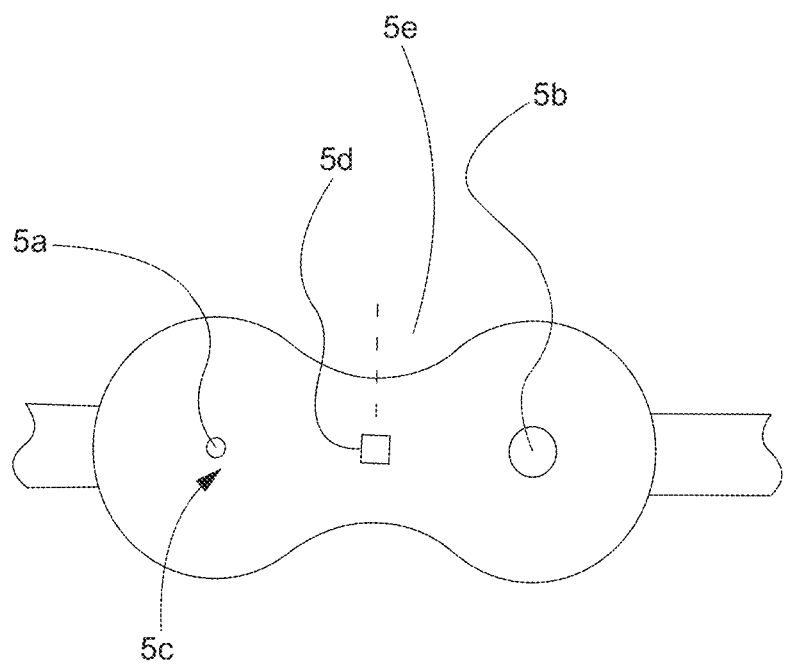
FIG. 5B illustrates a battery powered non-invasive biosensor 113. This biosensor 113 will, in real-time and contemporaneously, measure riders' physiologic parameters, such as lactate clearance level from an oxygenation reading, throughout the course of their exercising event. An optical emitter 5a is used to emit a specific wave length of light into an exerciser's muscle tissue located underneath the emitter. A comparative optical receiver 5b receives back the refraction light wave from that which was earlier emitted by the emitter into the exerciser's muscle tissue and blood cells located therein. An optical wave comparative analyzer 5c compares the wave length from the emitter with that which was received back, and deduces therefrom the condition of specific bio markers in the exerciser's muscle tissue. For example, early in the rider's exercise activity, the oxygen molecules per hemoglobin may have been 4, but at a much later time in this same exercise activity, the exerciser's oxygen molecules per hemoglobin may read 3, 2, or 1 oxygen molecule per hemoglobin. In this case, the exerciser is on his way to reaching his lactate threshold level, at which point the monitored muscle tissue will no longer function, and the exercise will be finished, whether the exerciser has completed the finish line of his competitive event or not. A radio and antennae 5d transmits and receives data to and from the data computing device (computing device) shown in FIG. 7. Radio wave length waves 5e, or other wave length spectrum, are being transmitted from the biosensor 113 device to the data computing device (computing device) shown in FIG. 7 and its Digital Biomarker Storage and Processing Unit.
Figure 6A:
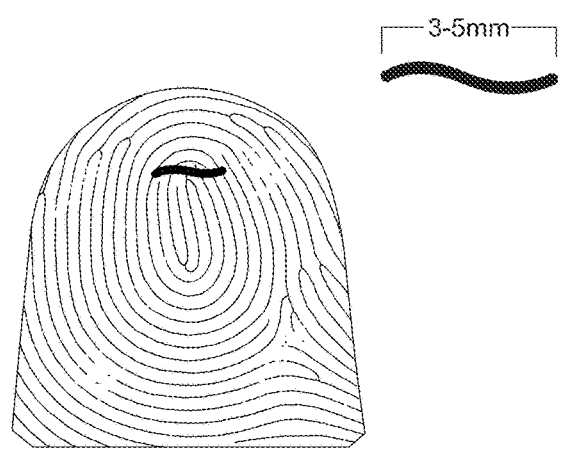
FIGS. 6a-6b illustrate a Profusa created Body Tissue Integrated BioSensor.
Figure 6C:
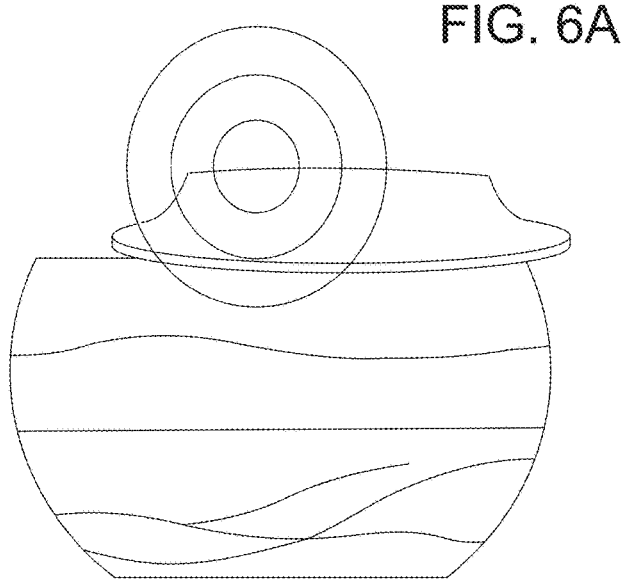
FIG. 6c illustrates an optical reader that can adhere to the skin of the exerciser, or it can be hand held. The reader initially emits excitation light through the skin to the biosensor, which then reflects from the tissue integrated biosensor 113 and back to the reader the relevant fluorescent light proportional to the amount of the specific biochemical measured on the "smart gel".
Figure 6B:
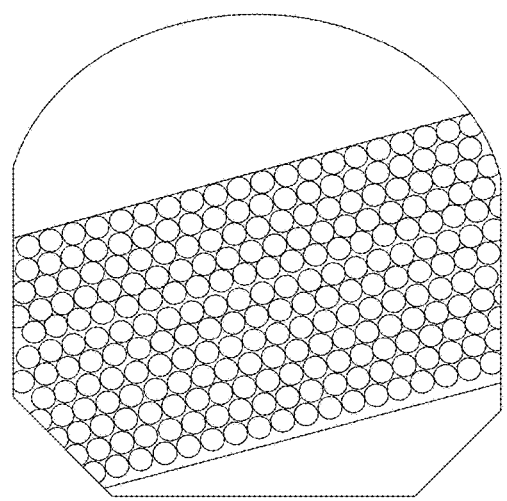
Figure 7:
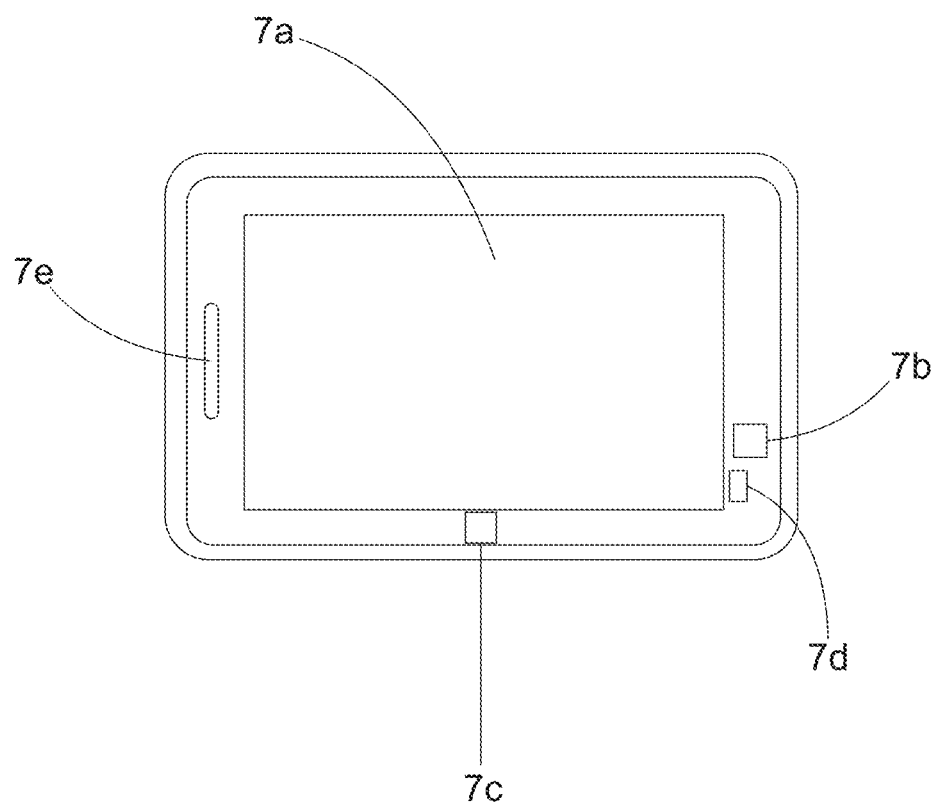
FIG. 7 is a compilation of equipment that receives, transmits, and processes data. Computing device 7a is comprised of, but not limited to, the following: radio to receive and transmit data, data storage system, and processor of such stored and newly received data; 7b is an antennae to broadcast the muscle modulating recommendation, and receive special data requests from the exerciser; 7c is a radio antennae designed to receive and transmit data between the computing device and biomarker sensors (See FIG. 5); 7d is a radio antennae for data transmitted and received between the computing device and satellites; and/or a radio antennae to transmit and receive data between the computing device and cell towers on their respective wave lengths; and 7e is a USB port into which the exerciser can plug the computing device (computing device) into a separate computer. Computing device 7a will perform various functions including, but not limited to the following: 1) store in its metabolic, geographic, and watt output database a library of historical metabolic metrics, geographic, and watt output information for a particular exerciser or exercisers developed during prior exercising activities; 2) Store other metabolic data regarding the specific exerciser gathered from the riders' prior physical exercising activities; this metabolic data can include, but is not limited to: heart rate, blood pressure, oxygen uptake capacity, red blood cell count, and oxygen saturation; 3) Store the geographic characteristics of prior and current treks which include for example: total elevation, number of hills, their grade and length, total surface distance of the treks, and location of the rider on the trek at specific times when asking the computing device to make its muscle group modulation recommendations; 4) store the watt readings associated with each biomarker reading; 5) utilizing historical bio-marker, geographic, and relevant watt data, the computing device will calculate and establish a base line of optimum watt output levels for the exerciser's various classes of muscle groups on an on-going basis; 6) in real-time, while various muscles are currently being exercised, bio-marker sensors will measure the current condition of a given bio-marker, such as its hemoglobin oxygen concentration, heart rate, or in real-time levels of measured watt output; 7) the bio-sensor will wirelessly transmit this real-time bio-marker data to the bio-marker library and processor, where it will be processed; 8) watt meters measuring watts on the driving wheel axle, pedals, crank axle, or forearm bars will transmit their real-time watt readings to the data storage bank for further processing; 9) receive relevant real-time geographic data from satellites or micro-cell towers defining the location of the exerciser, store, and process this geographic data along with the biomarker and watt reading data; 10) based upon the processor's comparison of the baseline bio-marker and watt reading data to that gathered and stored in the database of computing device 7a of the current real-time reading for that bio-marker or markers, it will calculate the amount of energy (watts) the participant should be delivering to the drive wheel from muscle groups located in the classes of muscles comprising, but not limited to, the legs, arms, or legs plus arms simultaneously together, in order to optimize the exerciser's physical performance; and 11) once the computing device has processed the relevant Biomarker data from the exerciser, and geographic data down-loaded from a satellite or micro cell, it will transmit its recommended energy (watts) output that each of the exercising and monitored sets of muscle groups should be exerting. This recommended modulation muscle output data will be transmitted to the display screen 1e on the bike (See FIG. 1), or display screen on the surface of goggles or glasses worn by the exerciser. The recommendations may also be broadcast verbally, or by some other useful means to the exerciser.

A predicate for operation of this Muscle Optimizing Modulator is to first input enough bio marker data (FIGS. 5, 6) from the rider's previous exercising experiences so that the computing device (FIG. 7) can establish baseline metabolic curves for parameters measured during exercise activities. The more exercising rides that the exerciser completes the more broad-based and accurate will be his baseline data curves. Some of the biometric parameters that can be measured (FIGS. 5,6) and utilized by the computing device (FIG. 7) include, but are not limited to, the following: the exerciser's oxygenated hemoglobin concentration levels at various power levels (FIGS. 2,3,4,5,6), deoxygenated hemoglobin concentration levels at various power levels, total hemoglobin concentration levels at various power levels (FIGS. 2,3,4,5,6), and the relationship of lactate clearance levels (FIGS. 10,11,12a and 12b) at each of the preceding parameters (FIGS. 5,6), relative to the lactate threshold level (FIGS. 10,11,12a and 12b) or alternatively one's maximum steady state lactate clearance level (FIGS. 10,11,12a and 12b), which is stored in the processor's bio marker data bank (FIG. 7). The preceding lactate level relationships (FIGS. 10,11,12a and 12b) are then processed (FIG. 7) relative to the instantaneous power levels expended by the exerciser in his monitored muscle classifications of arms, legs, and core (FIGS. 2,3,4). If his leg (FIGS. 1 and 4) muscle's lactate clearance level (FIGS. 10,11,12a and 12b) is too close to its lactate threshold level (FIGS. 10,11,12a and 12b), but his arm (FIG. 1b) lactate clearance level (FIGS. 10,11,12a and 12b) is not very close to its lactate threshold level (FIGS. 10,11,12a and 12b), then the computing device (FIG. 7) will calculate the amount of energy (watts) that should be reduced by the exerciser in his legs (FIGS. 1 and 4), and at the same time, how much energy (watts) the rider should increase with his arms (FIGS. 2,3,4). The time duration of the exercise activity, as well as geographic parameters of the trek (FIG. 9a), can also prove useful to the computing device in the muscle modulation energy optimization calculation (FIG. 7).

If the rider is wearing the requisite equipment to measure his heart rate and respiratory rate, the computing device (FIG. 7) will also take these real-time and contemporaneous measurements into account in recommending and broadcasting (FIG. 1) the power the rider should be generating from each monitored working muscle group (FIGS. 2,3,4).

If the rider wishes to have the computing device (FIG. 7) calculate the optimum power that he should be expending from his arms and/or legs (FIGS. 1-4) at specific points on a pre-determined long distance route, then the computing device (FIG. 7) needs to have inputted into it (FIG. 7) the geographic data for this route (FIG. 9a), as is shown on such equipment manufactured by Strava or Google Maps, plus the requisite Biosensor 113 bio marker readings. It is also useful for the data bank library to have stored in it (FIG. 7) the incremental watts that an exerciser can use from rotationally oscillating his forearm bars (FIG. 1) and thereby delivering power levels (FIGS. 2,3,4) into the crank axle relative to various lactate clearance levels in his arm muscles (FIGS. 5,6). This same bio marker data from exercising just his legs (FIGS. 10,11,12a and 12b) should also be stored in the data bank (7). Other subjects of useful information stored and processed in the data bank (FIG. 7) are: a) the amount of energy that a rider has used in previous rides to climb specific vertical feet, b) the grade and distance of such vertical feet, and c) power relative to the heart rate of the exerciser. The latter element helps to define an exerciser's ultimate fatigue factor, as distinguished from their muscles reaching their lactate threshold. For example, a high heart rate relative to a low power level is indicative that exercisers are moving into their ultimate fatigue condition.

It is also important to know the power generated from the exercisers' following muscle group classifications (FIGS. 2,3,4):

1. Total power (watts) generated simultaneously from both: a) rotational oscillations of the exerciser's forearm bars (FIG. 1d) and b) pedaling his legs (FIG. 3,4);

2. The power (watts) that the rider can input only from rotational oscillation of his forearms (FIGS. 2,3,4,5); and 3. The power (watts) that the rider can input from performing the exercise activity from using only his legs (See FIGS. 3,4).

Figure 1:
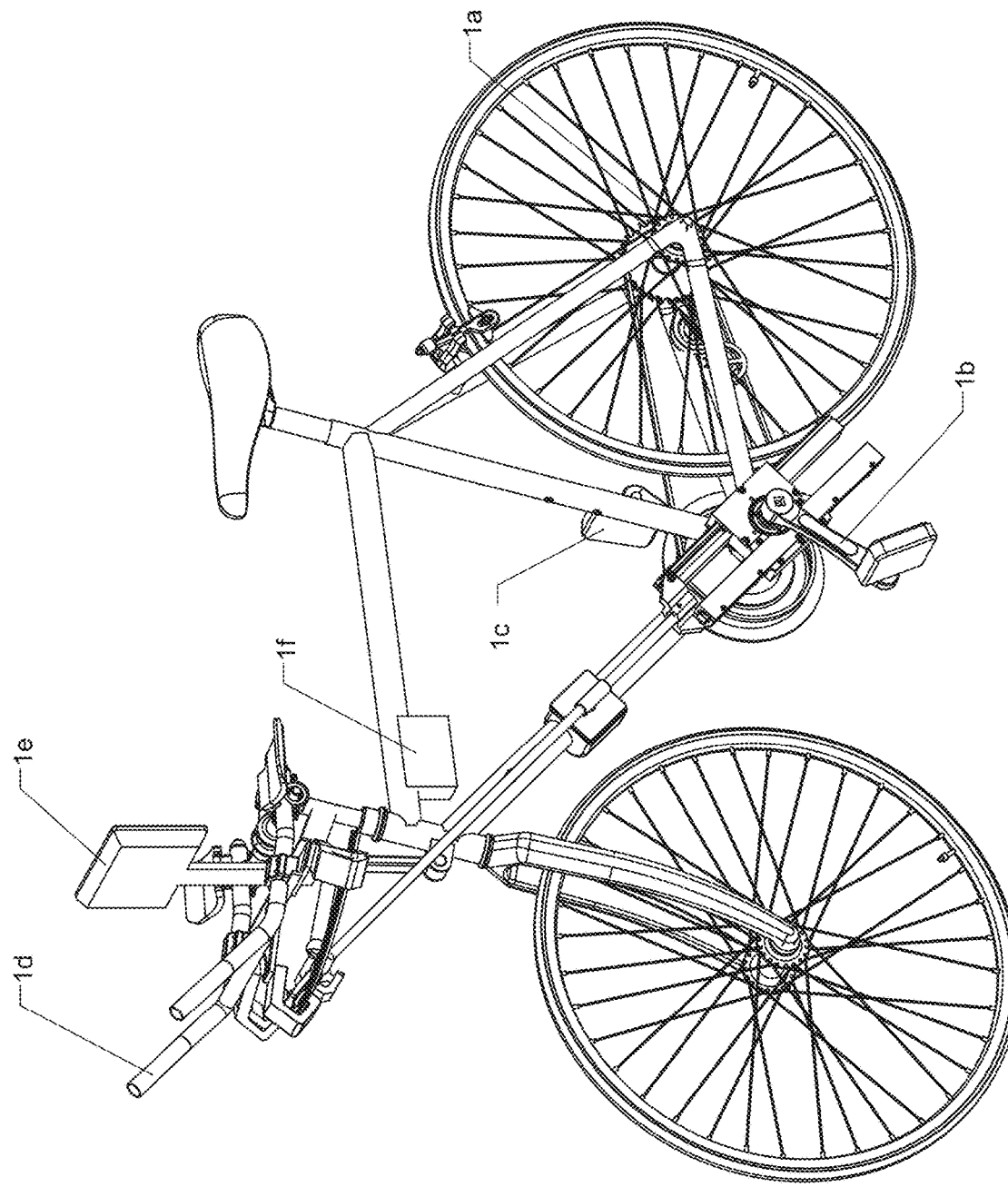
FIG. 1 is a side view of a Dual Power Bike.

FIG. 1 is a side view of a Dual Power Bike. FIG. 1 the location of the following: a) Display Screen 1e to broadcast Muscle Optimizing Modulator recommendations to the exerciser, and b) Vertically rotational forearm bars 1d oscillated by the rider, and that allow for modulation of energy output between muscle groups in the arms and legs to optimize the rider's exercise experience. Also shown is a rear axle housing 1a, a crank 1b and pedals 1c.

FIG. 2 is a watt meter located inside the rear axle housing of a Dual Power Bile. FIG. 2 shows a watt meter (such as a Power Tap), located inside the rear axle housing 1a, and measures the number of watts being delivered into it by the rider from all muscle groups being used to input power.

The power level from the rider powering the bike (FIG. 1) with just his legs can be directly measured from use of Crank or Pedal Watt Meters (FIGS. 3,4). The Power Tap (FIG. 2), on the other hand, measures the total number of watts being delivered into the driving wheel from all sources of energy output-arms and legs. Assuming the rider is using both his arms and legs (FIGS. 1-4) to power the bike (FIG. 1), the computing device (FIG. 7) will calculate the amount of energy (watts) that the rider is inputting from oscillating only his arms (FIG. 1). The calculation would be "TP (Total Power)–LP (Leg Power)=AP (Arm Power).

In addition, the computing device (FIG. 7) will need bio marker information (FIGS. 5,6) from the exerciser of his current level of lactate clearance of the working muscles being monitored (FIGS. 10,11, 12a and 12b). This lactate clearance level (10,11, 12a and 12b) will then be processed and compared (FIG. 7) to his historical lactate threshold level (FIGS. 10,11, 12a and 12b) for this muscle group under comparable working conditions, which is stored in the processor's bio marker data bank (FIG. 7). The current level of a rider's lactate clearance condition (FIGS. 10, 11, 12a and 12b) can be obtained in real-time from use of a Biosensor 113 (muscle oxygenation sensor measuring device) (FIGS. 5, 6). Such products are manufactured by companies such as BSX Insight, Moxy and Profusa. These muscle oxygenation devices (FIG. 5a, 5b, 6) can measure several different bio marker classifications and then calculate what the rider's current lactate clearance level (FIGS. 10,11,12a and 12b) is relative to his lactate threshold (FIGS. 10,11,12a and 12b). Some of the bio markers that the BSX Insight muscle measuring device (FIG. 5a, 5b, 6) can measure to determine the rider's real-time level of lactate secretion and clearance (FIGS. 10,11,12a and 12b) include: a) time course for the concentration of oxygenated hemoglobin, b) time course for the concentration of deoxygenated hemoglobin, c) time course of the concentration of total oxygenated hemoglobin, and d) time course for the concentration of the Tissue Oxygenation Index. FIG. 5A is illustrative of the use of a non-invasive Muscle Oxygenation Sensor used to measure a cyclist's muscle oxygenation (SmO2) level in real-time. Data from a plurality of Muscle Oxygenation Sensors may be displayed to the user, providing the user with current biometrics for each of a plurality of muscle groups.

For example, a biometric sensor, such as Muscle Oxygenation Sensor, may measure SmO2 from the quadriceps complex, a second biometric sensor may measure SmO2 from the shoulders and a third biometric sensor may measure SmO2 from the abdominal wall "core" muscles. Each set of biometric measurements are transmitted to the display unit, wherein the data for each muscle group/sensor is displayed in a separate area of the screen. Acceptable ranges for these measurements are determined based upon characteristics of the user, comprising age, weight, gender, hemoglobin amount hemoglobin saturation, hematocrit, cerebral artery flow rate of red blood cells, and the like, and input into the invention's data storage bank. The exercise system may operate to compare the measured characteristics of the user to higher stratification levels of the characteristics, such as, without limitation, hematocrit and oxygen saturation levels of the general human population. The exercise system may include an algorithm to process the data and make a recommendation for how much increase is needed in one or more of the foregoing parameters or characteristics measured. In some embodiments, data in an acceptable range is displayed in a first color, such as green, while data in an unacceptable range is displayed in a second color, such as red. In this way, the system immediately alerts the rider or other user to modulate effort between the plurality of monitored muscle groups to restore or maintain biometric indicators of metabolism within a desired range.

The muscle oxygenation empirical data that will be displayed on FIG. 1e is based upon the exerciser having strapped-on, over the muscle group that is being monitored, a bio marker measuring device (FIGS. 5A, and 5B), which uses Near Infrared Spectroscopy (NIRS), to measure the oxygenated hemoglobin and deoxygenated hemoglobin of a particular muscle that is being monitored and exercised. As the rider places a higher performance load on the working muscle, more oxygen is required for delivery to this muscle in order for the oxygen molecules to carry away the increased lactate being secreted by the working muscle. (FIGS. 10, 11, 12a and 12b). As the available oxygen molecules, contained in the hemoglobin, decrease relative to the increasing energy demands placed on the muscle, the lactate clearance ability for that muscle is reduced (FIGS. 10,11,12a and 12b). Once the lactate threshold level is reached, the working muscle will shortly no longer be able to supply energy for the exerciser, and he will need to greatly reduce his muscle exercise energy quotient in order to permit the oxygen supply to that muscle to be reconstituted (FIGS. 12a and 12b). This will occur from the rider quitting or significantly reducing his exercise activity, and allowing for restoration of its normal oxygen supply.

Thus, a condition develops in the physiologic parameters of the exerciser while the rider is pedaling with and working his leg muscles. The exercising leg muscle's lactate threshold level is reached, and his leg muscles no longer can supply any energy to propel the bike (FIGS. 10,11,12a and 12b). Conversely, viewing the muscle groups of the body on a macro basis, there are other muscle groups within the exerciser's body, his arms that have not yet been called upon to exert energy into propelling the bicycle. (See FIGS. 8 and 12) For example, until the advent of the Dual Power Bike, there were no other muscle groups available to assist the rider's leg muscles in propelling the bicycle. However, now that the rider's arm muscles (FIG. 1) are available to provide additional energy to propel the bike, a new set of kinesiology dynamics have been created (See FIG. 8). The rider's ability to use more muscle groups to propel the bike (FIG. 1), namely his arm muscle tissue, alters the macro kinesiology dynamics by increasing the number of total watts that an exercisers muscle groups can deliver into the drive wheel (FIG. 8).

Use of arm muscles (FIG. 1), in addition to leg muscles (FIGS. 1 and 4), will also allow the exerciser to increase the power output, plus duration of his exercise experience at a higher level of maximum steady state lactate clearance. (See FIG. 11).

For example, assume that a rider is riding a Dual Power Bike (FIG. 1), and is initially powering the driving wheel using only his legs (FIG. 4). This cycling activity yields a current leg muscle lactate reading of 240 watts, whereas this rider's leg muscle lactate threshold is 230 watts. Because the rider's energy output from his legs exceeds his lactate threshold, he will need to reduce the amount of energy (watts) being expended from his legs (FIG. 3,4), or else he will quickly have his ride ended from an inability of his working leg muscles to keep putting-out energy. But because he is using a Dual Power Bike (FIG. 1) and a Modulating Muscle Optimizer, he will be able to continue his ride. To do this, he must engage a new source of energy, created from using his arm muscles to oscillate his forearm bars (FIG. 1), which will add an additional source of power into rotating the load bearing driving wheel. By adding 15% more total power into the driving wheel from oscillating his forearms (FIG. 1), he will be putting-out at least an extra 30 power levels into rotating the driving wheel (FIG. 2). Use of this additional 30 watts of arm power (FIG. 1) permits the exerciser to reduce the power being exerted from his legs (FIG. 4) to 216 watts. The use of the rider's arm power is a substitute for the reduced 30 watts of leg energy. The new and reduced 216 watts of working leg power (FIG. 4) is well below the 230-Watt lactate threshold level for his working leg muscles (FIGS. 3,4). This also translates into a reduction of the oxygen quantum required to absorb the reduced amount of lactate that is now being secreted from his leg muscles. Essentially the lactate threshold curve for the muscles in the legs of the rider has now been shifted to the right. (See FIG. 11). This set of new dynamic lactate clearance conditions (FIG. 11) will permit the rider to ride for a significantly longer time because he's using less leg energy (watts) from his working leg muscles.

Alternatively, by adding the 24 extra watts created from his arm muscles oscillating his forearms (FIG. 1), but reducing his leg energy output to 230 watts from his leg-only lactate threshold level of 240 watts, yields a total power quotient at the driving wheel of 254 watts (FIG. 2). This is still more energy than the original 240 watts that was being generated from exercising his legs only. At the same time the exerciser's leg muscles are now operating at just the precipice of their 230 watt lactate threshold. This is the strategy a rider may employ if he chooses to reach the lactate threshold of his arms and legs (FIGS. 1-4) just as he crosses the finish line of a competitive event (FIGS. 10,11,12a and 12b).

In situations in which a rider is continuously exercising on a long trek, the exerciser needs to be concerned with at least two substantive issues: a) on multiple occasions he will exceed his lactate threshold level (FIGS. 10,11,12a and 12b), and will then need to back-off the amount of exerted energy (watts) in order to allow his muscle groups to rebuild their oxygen level (FIGS. 10,11,12a and 12b), b) however, each time that the muscle groups rebuild their oxygen level, they start at a lower level of oxygen regeneration, and are thus not as strong as they were prior to the last time the muscle groups reached their threshold levels (See FIGS. 12a and 12b) and b) the exerciser can no longer continue his exercise due to total body fatigue in both his muscles and respiratory system (FIGS. 10,11,12a and 12b). In order to preclude the rider from experiencing these early exercise-ending events, it will be useful for the computing device (FIG. 7) to be inputted with not only the rider's bio marker data, but also information relative to the vertical geography and surface distance of the complete trek (FIG. 9a). With this additional information, the computing device (FIG. 7) can more accurately recommend to riders the various watts they should be exerting from modulating energy being inputted by their arms and legs (FIGS. 1-4) muscles, in order to optimize their physical fitness performance (FIGS. 2,3, 4,8,9). The reason for this being possible is that the processor's data bank (FIG. 7) will know how much reduction in oxygen rebuilding capacity this exerciser experiences with each succeeding oxygen rebuilding effort (FIGS. 12a and 12b). If the rider does not periodically reduce his energy input level, he will more quickly reach his lactate threshold, hit the wall, and not finish the exercising activity (FIG. 10, 11).

Once the computing device (FIG. 7) has been inputted with the number of vertical feet left in the trek, the number of hills and their grades, along with the overall surface distance to travel (FIG. 9a), the computing device (FIG. 7) will be able to accurately broadcast to the exerciser the specific watts he should be delivering and modulating between his arm and leg (FIGS. 1-4) muscles in order to optimize his physical performance on this specific trek or ride (FIGS. 2,3,4).

Because the processor's data bank library (FIG. 7) contains base line metabolic data developed from the rider's past exercising activities, it (FIG. 7) can recommend power levels that the rider should be achieving from both his arms and legs (FIGS. 1d,2,3,4). These recommended power levels will be based upon the computing device (FIG. 7) taking into account information which includes, but is not limited to, the following: a) bio marker base line data currently stored in the data bank library (FIG. 7), b) current real-time readings of relevant bio marker information such as a plot of the exerciser's time course of concentration of oxygenated hemoglobin taken from the exerciser's oxygenation measuring sensors strapped over his exercising muscles (FIGS. 5,6), c) historic power readings under similar conditions d) information of the specific location that the rider is currently positioned on a geographic map of this trek, which will include all of the vertical elevation sections remaining to be climbed, and the specific surface distance that has already been ridden, plus the remaining distance to be traversed on this trek (FIG. 9a). All of this geographic information is available from trek mapping services such as Strava. The wireless transmission and receiving of this geographic data (FIG. 9a) will be from a radio and antennae (FIG. 7). Data from the Biosensor 113 (FIGS. 5a and 5b) will be transmitted from a radio and antennae (FIG. 7). Other processors, for example sports data devices, may substitute for the one shown in (FIG. 7), and they may be worn by the exerciser. However, any such substitute computing device must contain the necessary software and hardware equipment for the exerciser to operate the Muscle Optimization Modulator, such as that as described herein. The necessary software and hardware shall be that which is necessary to achieve the level of accuracy and purpose that is useful to an exerciser and user.

In some embodiments, an exerciser may wish to achieve certain fitness goals. These fitness goals may include, but are not limited to weight loss, increased arm strength, increased leg strength, increased core strength and the like. An important set of data that the exerciser needs to be concerned with includes two substantive issues: a) on multiple occasions he may exceed his lactate threshold level (FIGS. 10,11,12a and 12b), and will then need to back-off the power level to limit anaerobic metabolism (FIGS. 10,11,12a and 12b), however, each time that the muscle groups rebuild their oxygen level, they start at a lower level of oxygen regeneration, and are thus not as strong as they were prior to the last time the muscle groups reached their threshold levels (See FIGS. 12a and 12b) and b) the exerciser can no longer continue his exercise due to total body fatigue in both his muscles and respiratory system (FIGS. 10,11,12a and 12b). In order to preclude the exerciser from experiencing these early exercise-ending events that will inhibit the exerciser from optimally reaching his fitness goals, it will be useful for the computing device (FIG. 7) to be inputted with information relative to the fitness goals. With this additional information, the computing device (FIG. 7) can more accurately recommend to exercisers the various watts they should be exerting from modulating power being inputted by their arm and leg (FIGS. 1-4) muscles, in order to optimize their physical fitness performance (FIGS. 2,3,4,8,9) and to reach and/or exceed their fitness goals. The reason for this being possible is that the processor's database (FIG. 7) will store the amount of reduction in oxygen rebuilding capacity this exerciser has with each succeeding oxygen rebuilding effort (FIGS. 12a and 12b). If the rider does not periodically reduce his power level, he will more quickly reach his lactate threshold, hit the wall, and not finish the exercising activity (FIG. 10, 11). Additionally, based on the exerciser's fitness goals, the computing device (FIG. 7) may monitor the power levels in order to alert the exerciser of the proper power level required to optimize obtaining the exerciser's fitness goals. Further, the computing device (FIG. 7) may automatically establish intermediate fitness goals in order to achieve the overall fitness goals, which may be a workout fitness goal, a daily fitness goal, a weekly fitness goal, a monthly fitness goal and the like. Once the computing device (FIG. 7) has been inputted with the fitness goals of the exerciser, the computing device (FIG. 7) will be able to accurately broadcast to the exerciser the specific watts he should be delivering and modulating between his arm (FIG. 1) muscles, leg (FIG. 4) muscles and other bio monitored muscles in order to optimize his physical performance to reach the fitness goals.

A mobile computing device receives data via radiofrequency transmissions from each sensor, in some embodiments. The mobile computing device may then upload the data to computing device (FIG. 7). Wherein a cellular network is not immediately available, such as in remote geographic areas, and the mobile computing device comprises a memory, data may be cached for later uploading to computing device (FIG. 7) when the mobile computing device is again within range of a cellular network.

The computing device (FIG. 7) executes an algorithm 124 to correlate measurements from each of the plurality of sensors with a metabolic curve generated from a bank of stored baseline data specific to the user. Proximity to the aerobic threshold at an instantaneous power level is extrapolated from the metabolic curve for that parameter. By combining multiple parameters, computing device (FIG. 7) produces a more accurate approximation of the maximum power possible without crossing the aerobic threshold, wherein the user may modulate his overall exercise intensity to minimize lactate formation and muscle fatigue. In some embodiments, computing device (FIG. 7) calculates relative contributions of power from each of the plurality of muscle groups, in arms and/or legs and/or core, in any number or combination, to optimize performance. The user receives continuous, immediately taken feedback to modulate power levels between different muscle groups, resulting in delivery of the maximum possible total power to a drive wheel of a bicycle (or equivalent structure in a non-bicycle exercise device) without crossing the user's aerobic threshold. In this manner, the system performs as a muscle optimizing modulator.

In some embodiments, computing device (FIG. 7) utilizes a maximum heartrate data point to further modulate the user's power output. For example, a user may manually input a maximum heartrate which is not to be exceeded during exercise. In some embodiments, a party other than the user inputs the maximum heartrate, such as a physician or athletic trainer. Accordingly, computing device (FIG. 7) modulates recommended power output between the plurality of muscle groups, such as in the arms and legs, for example, to maximize total power delivered to the drive wheel, limited by the input maximum heartrate. In some embodiments wherein the user of the apparatus and method is riding an electric bicycle, or similar power-assist device, computing device (FIG. 7) integrates external power, such as that provided by an electric motor of an electric bicycle, with user-generated power from each of the plurality of muscle groups to modulate power levels between different muscle groups and the external power source, resulting in delivery of the maximum possible total power to a drive wheel of a bicycle.

An example wherein modulation between muscle groups of the exerciser and an external power source, such as a drive motor of an electric bicycle, occurs with a user cannot allow his heartrate to exceed a set rate without danger of cardiovascular collapse. A maximum safe limit for the user's heartrate is determined by a physician or similar healthcare provider, and is provided for safety reasons. Such a user benefits from being able to exercise up to, but not exceeding this heartrate limit. In some embodiments, therefore, computing device (FIG. 7) modulates power levels between the plurality of muscle groups according to both an input maximum heartrate and an assist device, such as an electric motor functionally coupled to a drive wheel of a bicycle. The input maximum heartrate is input to the computing device using a user input device, such as a touchscreen or a keyboard, for example.

Because the processor's 112 database library (FIG. 7) contains base line bio marker information developed from the exerciser's past exercising activities, it (FIG. 7) can recommend specific energy (watt) levels that the exerciser should be achieving from both his arms, legs (FIGS. 1-4) and other muscle groups based upon the inputted fitness goals. Further, the computing device (FIG. 7) may determine incremental fitness goals to reach the ultimate fitness goal, such as but not limited to workout goals, daily goals, weekly goals, monthly goals or combinations thereof. These incremental goals may include multiple workouts/exercises that the exerciser may utilize in order to meet the ultimate fitness goals. Additionally, these incremental fitness goals may include input of an exercise activity and storing the exercise activity input in the database (FIG. 7). The exercise activity input may include external data comprising geographic information, weather information, terrain, elevational changes, altitude or combinations thereof. The recommended modulating energy (watt) levels will be based upon the computing device (FIG. 7) taking into account information which includes, but is not limited to, the following: a) bio marker base line data currently stored in the database library (FIG. 7), b) current real-time readings of relevant bio marker information such as, but not limited to a plot of the exerciser's time course of concentration of oxygenated hemoglobin taken from the exerciser's oxygenation measuring sensors strapped over his exercising muscles (FIGS. 5A, 5B, and 6), c) watt readings at various biomarker readings, and d) information of the specific fitness goals. Data from the Biosensor 113 (FIGS. 5A and 5B) will be transmitted from a radio and antennae (FIG. 7) or any other wireless or wired transmission means. Other processors, for example sports data devices or fitness trackers, may substitute for the one shown in (FIG. 7), and they may be worn by the exerciser. However, any such substitute computing device must contain the necessary software and hardware equipment for the exerciser to operate this Muscle Optimization Modulator as described herein.

The computing device (FIG. 7) may automatically calculate calories to burn to meet the fitness goal or incremental fitness goal. The computing device (FIG. 7) may automatically calculate and broadcast modulation recommendations for the energy input of the monitored muscle groups to optimize the burning of calories to meet the fitness goal or incremental fitness goal.

It should be understood that while the embodiments are directed to a dual powered bike, other types of exercise devices may be utilized with the present invention and the Muscle Optimization Modulator may determine the exercises with respect to the type of exercise device/machine that is being utilized by the exerciser.

While this invention has described a methodology, plus examples of a group of electronic, optical, and biotechnology devices useful in executing this methodology, there are many other devices in these same classes of application that will also allow this methodology to be successfully implemented. Some of these other devices will also permit this Muscle Optimization Modulator methodology to be applied to other applications such as monitoring weight change, monitoring strength change of muscle tissue in legs, arms, hands, and core, monitoring the healing process of injured exercisers, monitoring the healing process of heart and respiratory damaged victims, monitoring the rehabilitation of disabled people, such as stroke victims, people with arm or leg fractures, and depressed people, monitoring functional improvements in persons with Parkinsonism or Parkinson's Disease, monitoring cognitive improvements in persons with Alzheimer's Disease or age-related cognitive decline, and monitoring overall neurologic status and function in persons with similar and other neurodegenerative diseases and conditions.

Because indoor stationary trainers, such as bicycles, elliptical trainers, rowing machines and treadmills, are now being ridden while the exerciser is virtually observing an outdoor trek (FIG. 9a) on an electronic screen (FIG. 1), this invention is also applicable to stationary bike, elliptical trainers, treadmills, stair climbers, rowing machines, cross-country skiing, and other exercising equipment used in physical fitness maintenance programs.

Regular recurring exercise which includes bursts of intense exercise incorporating as many muscle groups as possible is the most effective way for an individual to increase their $VO_2$ max. Currently available bicycles, however, have the limitation of vigorously exercising only muscle groups of the lower extremities but not involving the arms or muscle groups of the torso (core). Additionally, currently available devices and systems for increasing athletic performance, though providing indirect effects, do not act to directly increase or optimize intracerebral circulation and oxygen delivery to the brain as a means of preventing or treating degenerative diseases of the brain, including age-related cognitive decline.

In some embodiments, the invention generates a metabolic assessment during exercise. For example, computing device (FIG. 7) may receive measurements from a plurality of sensors, each measuring a biometric parameter. Sensors may be non-invasive, such as NIR trans-cutaneous oximeters and accelerometers. In some embodiments, sensors are subcutaneous or interstitial with trans-cutaneous monitoring of sensor output. A non-limiting example includes the bio integrated subcutaneous sensor manufactured by Profusa. Some non-limiting examples of biometric parameters include heartrate, oxygen saturation, respiratory rate, interstitial serum lactate levels, and the like.

In some embodiments, the baseline bio marker data includes any one or more of the bio markers consisting of heartrate, blood pressure, temperature, hemoglobin level, hematocrit level, oxygen saturation of hemoglobin, and intracerebral blood flow. In some embodiments, the baseline biomarker data includes any one or more of the serum biomarkers consisting of serum iron, serum ferritin, serum vitamin $B_{12}$, serum folate, serum glucose, serum insulin, erythropoietin alpha, angiogenin, and growth factors, such as epidermal growth factor, tumor necrosis factor alpha, insulin-like growth factor binding protein-1, insulin-like growth factor binding protein-2, and transforming growth factors alpha and beta.

Increasing oxygen delivery to the brain may decrease the risk of developing chronic neurodegenerative conditions, such as Alzheimer's disease, Parkinsonism, and dementia. Additionally, increased oxygen delivery to the brain and other tissues may improve such neurodegenerative conditions, or act to maintain improvement achieved through other means, such as with use of pharmacologic agents, stem-cell therapy, gene therapy, and following revascularization or tissue grafting surgery.

Feedback regarding hemoglobin saturation provided by optical sensor 5a may also be used by the rider to intentionally maintain a degree of desaturation. Hemoglobin desaturation reflecting a degree of systemic low oxygen tension, such as during anaerobic metabolism, in some persons, is a potent stimulator of erythropoietin (EpoA) secretion. EpoA causes a rise in hematocrit levels by increasing erythrocyte production in the bone marrow by progenitor and hemopoietic cells. An increased hematocrit enables a given volume of blood to hold more oxygen, and, therefore, to deliver more oxygen to tissues, such as muscle and brain tissue, for example, at the same cardiac output than the same volume of blood with a lower hematocrit. This effect is limited by an eventual decrease in blood flow that results from the increased viscosity of blood above a hematocrit of around fifty-two percent (52%), however this level is unlikely to be reached by physiologic stimulation, such as, but not limited to, hypoxic stimulation of the kidneys to produce more erythropoietin. Further, because the increased oxygen carrying capacity of blood with a slightly higher hematocrit are realized at all times, and not just during exercise, increased tissue oxygen delivery resulting from a system of optimizing muscle group performance is part of a system, in some embodiments, of preventing and treating neurodegenerative conditions, including Parkinson's Disease, Parkinsonism, Alzheimer's Disease, age-related cognitive decline, chronic traumatic encephalopathy, other neurodegenerative diseases and conditions, and other diseases responsive to increased tissue oxygen delivery.

Additional non-limiting examples of biometric parameters used by a computing device to calculate recommendations for modulating activity between muscle groups, or changing the duration, intensity, or frequency of the exercise activity, include baseline intracerebral blood flow, and baseline hemoglobin or hematocrit levels, in some embodiments.

FIG. 13 is a schematic diagram of a computing device of an apparatus for optimizing performance and health. FIG. 13 shows a computing device 100 for use in a device and method for optimizing a person's muscle group performance. In some embodiments, computing device 100 is a cell phone, a smartphone, a tablet device, a laptop computer, or a desktop computer. In some embodiments, computing device 100 is integrated within the exercise apparatus. In some embodiments, computing device 100 is integrated within the apparatus for optimizing performance and health. Computing device 100, in some embodiments, is a typical computing device having a microprocessor, a memory, a user interface, and a display typical of computing devices known in the art and commercially available.

As shown by FIG. 13, computing device 100 includes a memory 110 and a processor 112. A population data 120 and an individual baseline data 122 reside on memory 110.

Population data 120 may include normative clinical data from a population of individuals, including mean and standard deviation, information for heartrate, blood pressure, temperature, $VO_2$max, lactate threshold, hemoglobin level, hematocrit level, oxygen saturation of hemoglobin, intracerebral blood flow, intracerebral oxygen delivery, and blood's iron quotient for example. Population data 120 is stratified by age, in some embodiments. In some embodiments, population data 120 may additionally include biomarker data, such as serum iron, serum ferritin, serum vitamin $B_{12}$, serum folate, serum glucose, serum insulin, erythropoietin alpha, angiogenin, epidermal growth factor, tumor necrosis factor alpha, insulin-like growth factor binding protein-1, and insulin-like growth factor binding protein-2, testosterone, and somatotropic growth hormone.

Individual baseline data 122 include, but not limited to, any of the population data 120 listed herein immediately above, specific to the exerciser using the apparatus for optimizing performance and health. Individual baseline data 122 are obtained by standard measurement, whether invasive or non-invasive, and by standard laboratory testing, in some embodiments.

Processor 112 receives an input signal from a biosensor 113, or a plurality of biosensors 113, in some embodiments. Biosensor 113 measures a physiologic parameter in real-time and transmits the measurement to processor 112. Algorithm 124 resident on computing device 100 then uses population data 120, individual baseline data 122, and the physiologic parameter measurement to calculate a recommendation for the exerciser.

Processor 112 then transmits the recommendation to the exerciser via a broadcast means 114 communicatively coupled to computing device 100. In some embodiments, broadcast means 114 is any of a group of broadcast means consisting of a visual display, an audio speaker, a tactile means, and the like, examples of which have been discussed in greater detail herein above.

Through computing device 100, therefore, apparatus for optimizing performance and health is utilized, in some embodiments, to modulate exercise between muscle groups, and to direct duration, intensity, and frequency to maximize a performance or a health goal. Performance goals are discussed herein above. Health goals include, in some embodiments, increasing total body exercise capacity, including but not limited to $VO_2$max; shifting lactate threshold curves to the right; maximizing intracerebral oxygen delivery to prevent, treat, or maintain a functional level wherein the exerciser suffers from a degree of a degenerative neurologic condition such as age-related cognitive decline, dementia, Alzheimer's disease, Parkinsonism, or Parkinsonism, for example. In some embodiments, the health goal is to increase immunocompetence, or to treat or cure a malignancy. In some embodiments, the health goal is to reverse or slow cellular aging. In some embodiments the health goal is to bring the hematocrit level, hemoglobin level and saturation and cerebral artery blood flow rate up to a level high enough to provide sufficient oxygen to neurons and heart cells that they remain healthy.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A system for optimizing an exerciser's muscle group performance, the system comprising:
   an exercise apparatus operable by power delivered from more than one muscle group of the exerciser;
   watt meters that measures watts being delivered by the more than one muscle group of the exerciser;
   a computing device, wherein the computing device includes a database that contains baseline bio marker data of the exerciser; and
   bio sensors operatively coupled with the computing device, wherein the bio sensors in real-time monitor the more than one muscle group of the exerciser and measure bio marker information of the exerciser, the bio marker information comprising at least heart rate, and wherein the computing device is programmed to:
      generate a metabolic curve and aerobic threshold based on the baseline bio marker data of the exerciser stored in the database wherein the aerobic threshold at an instantaneous power level is extrapolated from the metabolic curve;
      continuously receive the measured bio marker information from the bio sensors and store the measured bio marker information in the database;
      automatically calculate modulation recommendations for energy output of the exerciser's bio monitored muscle groups operating the exercise apparatus in response to processing the measured bio marker information to calculate watts recommendation for each of the more than one muscle group by comparing the watts measured from the watt meters for each of the more than one muscle group and extrapolating from the metabolic curve to determine maximum power possible without crossing the aerobic threshold;
      broadcast modulation recommendations to the exerciser, wherein the modulation recommendations include watts to be delivered from each of the more than one muscle group;
      receive watts being delivered from the watt meters to determine if the modulation recommendations are being met; and
      continuously repeat the process in response to continuously receiving the measured bio marker data.

2. The system of claim 1, wherein the computing device is further programmed to determine duration, intensity, and frequency of modulations recommendations between the more than one muscle group to maximize a health goal.

3. The system of claim 2, wherein the health goal includes increasing total body VO2Max capacity.

4. A system for optimizing an exerciser's muscle group performance, the system comprising:
   an exercise apparatus operable by power delivered from more than one muscle group of the exerciser;
   watt meters that measures watts being delivered by the more than one muscle group of the exerciser;
   a computing device, wherein the computing device includes a database that contains baseline bio marker data of the exerciser; and
   bio sensors operatively coupled with the computing device, wherein the bio sensors in real-time monitor the more than one muscle group of the exerciser and measure bio marker information of the exerciser, and wherein the computing device is programmed to:
      generate a metabolic curve and aerobic threshold based on the baseline bio marker data of the exerciser stored in the database wherein the aerobic threshold at an instantaneous power level is extrapolated from the metabolic curve;
      continuously receive the measured bio marker information from the bio sensors and store the measured bio marker information in the database;
      automatically calculate modulation recommendations for energy output of the exerciser's bio monitored muscle groups operating the exercise apparatus in response to processing the measured bio marker information to calculate watts recommendation for each of the more than one muscle group by comparing the watts measured from the watt meters for each of the more than one muscle group and extrapolating from the metabolic curve to determine maximum power possible without crossing the aerobic threshold;
      broadcast modulation recommendations to the exerciser, wherein the modulation recommendations include watts to be delivered from each of the more than one muscle group;
      receive watts being delivered from the watt meters to determine if the modulation recommendations are being met; and
      continuously repeat the process in response to continuously receiving the measured bio marker data.

* * * * *